(12) United States Patent  
Knapp

(10) Patent No.: US 9,906,116 B2  
(45) Date of Patent: Feb. 27, 2018

(54) COMPACT IMPLEMENTATION FOR A HIGH-EFFICIENCY, VARIABLE-SPEED PERMANENT MAGNET MOTOR

(71) Applicant: Floyd H. Knapp, Placerville, CA (US)

(72) Inventor: Floyd H. Knapp, Placerville, CA (US)

( * ) Notice: Subject to any disclaimer, the term of this patent is extended or adjusted under 35 U.S.C. 154(b) by 174 days.

(21) Appl. No.: 15/048,945

(22) Filed: Feb. 19, 2016

(65) Prior Publication Data

US 2016/0285329 A1    Sep. 29, 2016

Related U.S. Application Data

(60) Provisional application No. 62/119,180, filed on Feb. 21, 2015.

(51) Int. Cl.
| | |
|---|---|
| *H02K 1/00* | (2006.01) |
| *H02K 53/00* | (2006.01) |
| *H02K 49/10* | (2006.01) |

(52) U.S. Cl.
CPC .......... *H02K 53/00* (2013.01); *H02K 49/106* (2013.01)

(58) Field of Classification Search
CPC .... H02K 21/04; H02K 21/046; H02K 11/048; H02K 2201/06
USPC ............................ 310/152, 179–181, 156.47
See application file for complete search history.

(56) References Cited

U.S. PATENT DOCUMENTS

| | | | | | |
|---|---|---|---|---|---|
| 2,968,755 | A | * | 1/1961 | Baermann | H02K 25/00 310/163 |
| 4,972,112 | A | * | 11/1990 | Kim | H02K 21/00 310/180 |
| 6,262,508 | B1 | * | 7/2001 | Shibayama | H02K 21/00 310/152 |
| 6,342,746 | B1 | * | 1/2002 | Flynn | H02K 1/12 310/181 |
| 7,683,514 | B2 | * | 3/2010 | Onuma | F16C 32/0465 310/181 |
| 7,847,453 | B2 | * | 12/2010 | Kim | F16C 32/0425 310/181 |
| 8,089,187 | B2 | * | 1/2012 | Budde | H02K 53/00 310/152 |

* cited by examiner

*Primary Examiner* — Thanh Lam  
(74) *Attorney, Agent, or Firm* — William C. Milks, III

(57) ABSTRACT

A compact high-efficiency motor is disclosed. The motor includes at least two rotor segments having passive magnetics comprising permanent magnets and at least two stator segments having active magnetics comprising permanent magnets and associated electromagnets controlled by a control system. The magnetic effect between the at two sets of magnetics can be modified to sequence the rotor segments through a series of rotation-induced steps by controlling the associated interaction of the magnetic fields produced by the two sets of magnetics. The electromagnets are energized by a control system to provide a variable-speed motor that produces high torque.

1 Claim, 26 Drawing Sheets

(1) Unit Overview (1) Unit Overview

Figure 24-

COMPACT IMPLEMENTATION FOR A HIGH-EFFICIENCY, VARIABLE-SPEED PERMANENT MAGNET MOTOR

CROSS-REFERENCE TO RELATED PATENT APPLICATION

This application claims the benefit of U.S. Provisional Patent Application No. 62/119,180 filed on Feb. 21, 2015, entitled COMPACT IMPLEMENTATION FOR A HIGH-EFFICIENCY, VARIABLE-SPEED PERMANENT MAGNET MOTOR, the disclosure of which is hereby incorporated herein in its entirety by this reference.

BACKGROUND OF THE INVENTION

1. Field of the Invention

The present invention relates generally to electric motors and, more particularly, to electric motors comprising permanent magnets. Specifically, one example in accordance with the present invention provides a compact high-efficiency motor comprising at least two sets of permanent magnets and further comprising electromagnets incorporated to be energized by a control system to provide a variable-speed motor that produces high torque and a method for providing a compact high-efficiency, variable-speed permanent magnet motor that produces high torque.

2. Description of the Prior Art

Known electric motors employ an electrical current to generate a magnetic field that interacts with another magnetic field to induce motion. There are two physical components for all electric motors, the armature, or rotor, which moves and the stator which is stationary. Known technologies for electric motors generally fall into two categories, fully-powered and a powered/passive combination. For a fully-powered motor an electrical current is used to generate the magnetic fields for both the rotor and stator. A combination motor incorporates permanent magnets to supply one of the magnetic fields, and an electrical current generates the other. Combination motors are typically operated from a DC power source.

An electric/magnetic motor operates by utilizing the magnetic attraction/repulsion between magnetic fields that are from the rotor and stator. When these two fields are directly opposite from each other, and magnetically centered, there is a maximum attraction between the two fields, but no torque is being applied to the rotor. To induce motion/torque into the rotor, the magnetic centers must be offset from each other to induce torque on the rotor.

U.S. Pat. No. 8,089,187, the disclosure of which is hereby incorporated by this reference in its entirety, describes a combination motor that includes two sets of permanent magnets and further includes electromagnets incorporated to be energized by a control system to provide a high-efficiency, variable-speed motor that produces high torque. In a described example, there are arrays of permanent magnets that are arranged as described, comprising two rows of permanent magnets wherein one row is mounted on a rotational magnetics assembly and another row of permanent magnets is mounted on a stationary magnetics and electromagnetics assembly. Although having the advantages of providing a high-efficiency, variable-speed motor that produces high torque that facilitates construction, the motor described in U.S. Pat. No. 8,089,187 may nevertheless have a size that is not compatible with all applications for such a motor.

It would be desirable to provide a motor that accommodates the size limitations of applications for motors that comprise two sets of permanent magnets. More particularly, it would be desirable to provide a motor that can be controlled to provide high torque at variable speed with high efficiency that is compact and may therefore be utilized for applications in which size imposes a constraint.

SUMMARY OF THE INVENTION

One example in accordance with the present invention provides a system and method for a compact motor having at least two sets of permanent magnets and further comprising electromagnets incorporated to be controlled to be energized to provide a compact high-efficiency, variable-speed motor that produces high torque. The system and method in accordance with the present invention provide a compact high-torque motor that requires only a small amount of electrical power, supplied by a rechargeable battery, for example, to initiate rotation. Also, energy stored in the magnetic field generated during operation of the motor is preferably recycled and may be used to recharge the battery. Consequently, the motor is very efficient and environmentally friendly. The principles of the present invention can also be applied to provide a generator having similar advantages.

In accordance with a non-limiting example of the present invention, a magnetically driven rotational assembly comprising at least one and preferably at least two sets of passive magnetics comprising permanent magnets and an electrically operated stationary assembly comprising at least one and preferably at least two sets of active magnetics comprising permanent magnets and associated electromagnets controlled by a control system are provided wherein the magnetic effect between the at two sets of magnetics can be modulated or otherwise modified or changed to sequence through a series of rotation-induced steps by controlling the associated interaction of the magnetic fields produced by the two sets of magnetics. There can be from one to an unlimited number of controlled magnetic changes sequenced through for each full rotation of the rotational assembly. Additionally, there can be from one to an unlimited number of individual rotation-induced steps, hereafter referred to as "phases," per operational torque generation sequence, hereafter referred to as a "power cycle." Each power cycle is individually time-sequenced so each power cycle occurs with overlap to produce a smooth total torque generation. The magnetic polarity of the rotor and stator permanent magnets may be either magnetically attractive or magnetically repulsive; either magnetic arrangement is equally effective but requires an opposite magnetic control sequence. In accordance with one non-limiting example, a mutually attractive magnetic polarity arrangement is employed. In the direction of induced rotation, there is a sequence of a "passive attraction arc" then followed by an "active repulsion arc" for each power cycle. During the active repulsion arc, the control system may activate the controlled active magnetics and adjust the "passive drag" from full drag all the way to full repulsion.

The direction of rotation of the rotor is determined by the sequence of the operational steps for a power cycle. Additionally, once a direction has been established, the control system may reverse the rotational direction of the developed torque to act as a dynamic brake or even reverse the rotational direction.

In accordance with one non-limiting example of the present invention, one array of permanent magnets is incorporated into a rotational magnetic assembly comprising the rotor such that having two or more arrays of magnets allows them to be arranged in a manner that balances the magnetic forces at all rotational angles of the rotor. By increasing the spacing between the permanent magnets of the arrays, the resulting magnetic field is not uniform, but increases or decreases between the magnets. This non-uniformity is useful in certain applications as it provides discrete indexing positions. The strength of the index points is a function of permanent magnet strength and the gap between the magnets.

In accordance with a preferred example, each array of permanent magnets comprising the rotor is spaced around the circumference of a segment of the rotor. Each array of permanent magnets may comprise permanent magnets equally spaced in sectors around the circumference of a rotor. In accordance with the preferred example, the rotor comprises at least one and preferably at least two such permanent magnetic arrays along the axis of the rotor to form the passive magnetics assembly.

In the preferred example, each permanent magnet has an approximately square cross-section and a length. The axial spacing between the permanent magnets is dependent on the length of each permanent magnet.

Additionally, in the preferred example a temporary magnetic field is produced by incorporating the electromagnets in the active magnetics assembly and used to upset the static magnetic balance between the passive magnetics and the active magnetics. The magnetic field from the permanent magnets only has to be partially canceled or enhanced in the region of magnetic interaction for a short period of time. This induces mechanical movement in the rotational magnetic assembly, that is, rotation of the one or more rotor segments. Accordingly, the greater the induced attraction/ repulsion, the greater the mechanical force available for work.

The temporary magnetic field can be either induced between any two radially adjacent permanent magnets or applied to a magnet. By placing the generated field between radially adjacent permanent magnets allows the two temporary field sources on either side of a permanent magnet to be used in conjunction to shift the center of magnetic flux and drag the rotational magnetic assembly based on that shift. By selecting the direction of the current flow though the electromagnet, the polarity of the generated magnetic field can be selected to either aid or reduce the field of the permanent magnet. Similarly, having the generated magnetic field applied directly to a magnet can either add to or reduce the field of the magnet. Either way, the balanced static flux is upset, and torque is generated in the rotational magnetic assembly.

The foregoing and other objects, features, and advantages of the present invention will become more readily apparent from the following detailed description of various examples of the present invention, which proceeds with reference to the accompanying drawing.

BRIEF DESCRIPTION OF THE DRAWING

The various examples in accordance with the present invention will be described in conjunction with the accompanying figures of the drawing to facilitate an understanding of the present invention. For the purpose of simplicity and clarity of explanation and demonstration, a non-limiting example having four phases per power cycle will be described. The principles disclosed are the same for any number of phases per power cycle. In the figures, like reference numerals refer to like elements. In the drawing.

DETAILED DESCRIPTION OF THE EXAMPLE EMBODIMENTS

Figure 1:
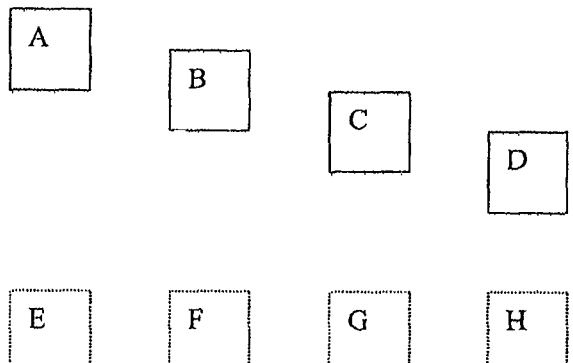
FIG. 1 shows the relative positioning of the rotational magnetic assembly (solid) and stationary permanent magnets and electromagnets assembly (dotted) rows for a parallel magnet array.

Generally, by way of background, a parallel magnet array has one horizontal row of magnets that is in a straight line and a second row that is staggered by a selected pitch. For a parallel array the pitch can be the height of the magnets or less. FIG. 1 shows the relative positioning of permanent magnetics comprising a rotational magnetic assembly (solid) and stationary permanent magnets and electromagnets assembly (dotted) rows. The placement of the horizontal row of magnets on the stationary permanent magnets and electromagnets assembly is simply for convenience. The parallel array will function with either horizontal or staggered rows on the rotational magnetic assembly and the opposite on the stationary permanent magnets and electromagnets assembly.

Figure 2:
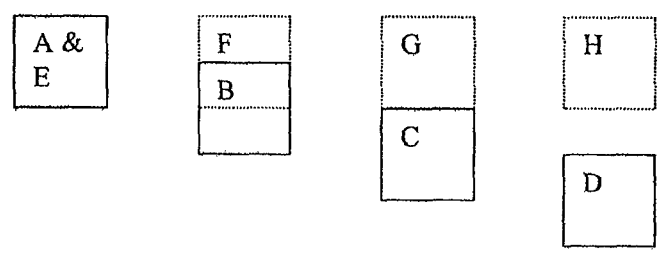
FIG. 2 shows the first index position for the two magnet arrays shown in FIG. 1.

FIG. 2 shows the first index position for the two magnet arrays.

Figure 3:
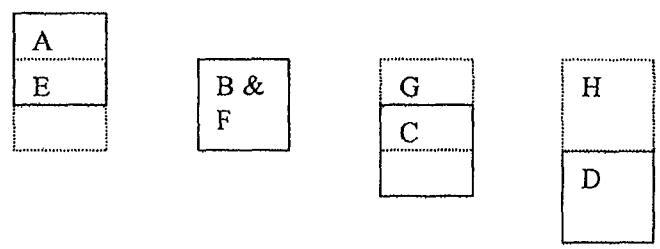
FIG. 3 shows the second index position for the two magnet arrays shown in FIG. 1.

FIG. 3 shows the second index position for the two magnet arrays.

Figure 4:
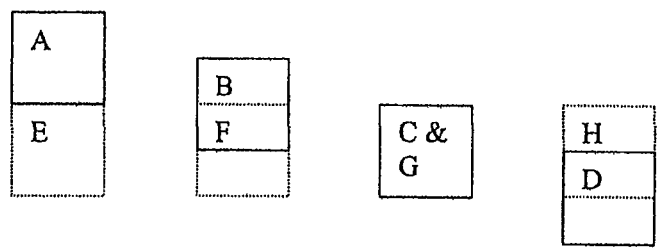
FIG. 4 shows the third index position for the two magnet arrays shown in FIG. 1.

FIG. 4 shows the third index position for the two magnet arrays.

Figure 5:
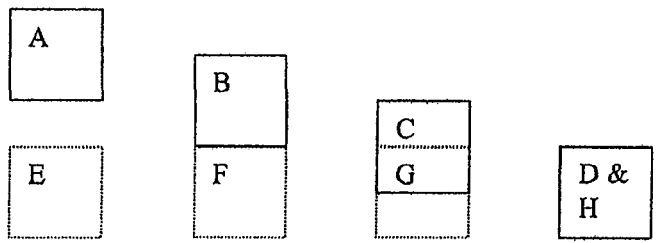
FIG. 5 shows the fourth/final index position for the two magnet arrays shown in FIG. 1.

FIG. 5 shows the fourth/final index position for the two magnet arrays.

In the above-described example, the number of magnetic indexes was chosen for clarity and simplicity of drawing. As the number of magnetic indexes increases, the size of the induced magnetic field required to cause an articulated magnet array to step to the next index point decreases. This is due to the reduced magnetic potential barrier between the index points.

In the foregoing described example the rotational magnetic assembly and stationary permanent magnets and electromagnets assembly are "magnetically balanced." This is defined as the attraction and drag forces being equal strength. An arrangement that has the magnets close enough together so there is no discernable magnetic potential barrier to overcome (step) when the rotational magnetic assembly is mechanically moved is defined as "perfectly magnetically balanced." When there are magnetic potential barriers to overcome due to the spacing of the magnets, the "magnetic balance" is from the force of the magnetic drag resulting from moving the rotational magnetic assembly away from the magnetic index which is counterbalanced by the force of attraction from the next magnetic index. As the magnets are moved relative to each other there is a drag while moving away from the first step, which decreases to zero at mid-step and then turns into an attraction to the next step index point. The drag and attraction forces are the same strength but of opposite directions.

Considered in more detail, the pole faces of all magnets have a magnetic center on the surface. This point is defined as the balance point where the magnetic mean of the total of all forces across the pole face is located. When the magnetic field is uniform, the magnetic center point is the geographical or structural center of that pole face. A non-uniform magnetic field will shift the magnetic center away from that geographic center.

When two magnets are interacting in-line, where the axes of both magnetic fields are aligned along the same axis, the two magnets will try to align themselves with the magnetic centers in-line with each other when opposite poles are facing; and when poles of the same polarity are facing, the maximum repulsion will be when the magnetic centers are in-line.

In accordance with the principle applied in accordance with the present invention, a magnetic center can be influenced by external forces. These can be either passive where a magnetically reactive material modifies the magnetic field or an external magnetic field is provided that modifies the subject magnetic field.

An external magnetic field can be generated that will either add to or subtract from a steady magnetic field. When the applied field is the same polarity as the static field, the magnetic center shifts toward the applied field, and the amount of shift is proportional to the strength of the external field. When the applied field is of the opposite polarity as the static field, then the strength of the static field is reduced in the direction of the applied magnetic field, and the magnetic center shifts away from the applied magnetic field.

Using a parallel magnetic array allows the scaling of the operational steps, typically twice the dimension of a magnet face in the direction of movement. The parallel magnetic array shown in FIGS. 1-5 results in a wider assembly but with a smaller step between possible lengths. This can be problematic when size imposes a constraint.

For the purposes of the following description of various examples in accordance with the present invention, the passive magnetics which produce static magnetic fields are presumed to be part of the rotational assembly of the motor, and the controlled active magnetics assembly is in a fixed physical position with respect to the rotational magnetics assembly. The controlled active magnetics assembly comprising permanent magnets and electromagnetics energized by a control system shall be referred to as an "active magnetics module." If the physical positions of the two types of magnetic-field sources comprised of the passive magnetics assembly and the active magnetics assembly are interchanged, the operational sequence and operational characteristics are substantially the same.

By way of one non-limiting example in accordance with the present invention, the physical configuration is to arrange the controlled active magnetics field sources comprising the active magnetics assembly in parallel to the rotational axis of the passive magnetics assembly, and the phase offset for each phase is derived by an angular offset between the cylindrically arranged static magnetic fields.

This example configuration has the advantage of being mechanically straightforward and facilitates design and construction of a compact motor.

The number of power cycles for each rotation has no impact upon the operational steps of each phase. The number of operational steps is equal to the number of phases. Having more phases results in a higher total power being developed and smoother torque generation.

Figure 6:
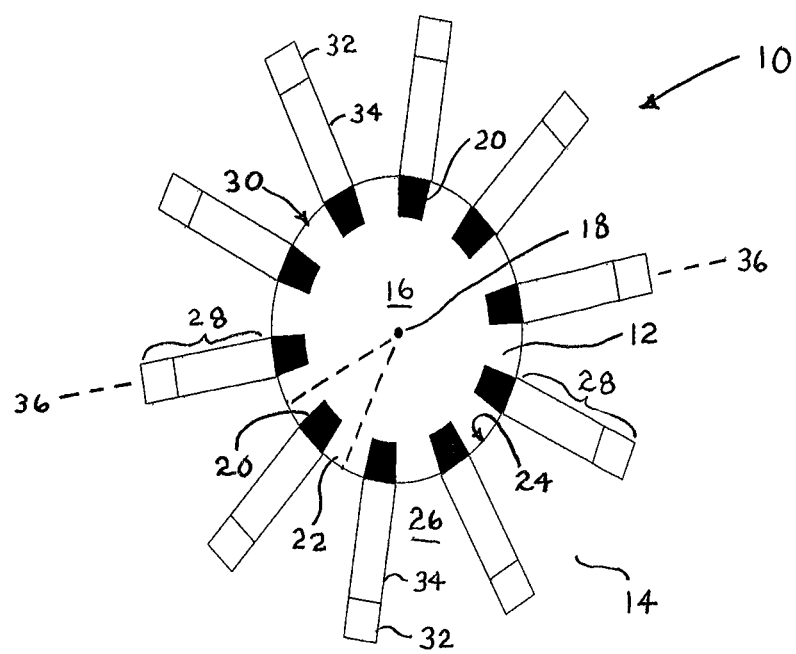
FIG. 6 shows a cross-section of rotor and stator segments of a motor in accordance with one example in accordance with the present invention.

Considered in more detail, FIG. 6 shows a cross-sectional schematic view of a motor 10 of one non-limiting example in accordance with the present invention. The motor 10 comprises a rotor 12 and a stator 14.

The rotor 12 comprises at least one rotor segment 16, the cross-section of which is shown in FIG. 6. Preferably, the rotor 12 comprises at least two such rotor segments 16 axially aligned along an axis 18 of the rotor 12.

The rotor segment 16 comprises at least one permanent magnet 20 and preferably comprises at least two such permanent magnets 20. As shown in FIG. 6, the rotor segment 16 has ten sectors 22 defining arc segments which collectively form the circumference 24 of the rotor segment. A permanent magnet 20 is centrally mounted in each of the sectors 22. By way of a non-limiting example, the motor 10 shown in FIG. 6 has ten permanent magnets 20 mounted in ten respective sectors 22 of the rotor segment 16.

As shown in FIG. 6, the stator 14 of the motor 10 comprises at least one stator segment 26, the cross-section of which is shown in FIG. 6. Preferably, the stator 14 comprises at least two such stator segments 26 axially aligned along the axis 18 of the rotor 12.

As shown in FIG. 6, each stator segment 26 comprises one or more active magnetics modules 28 equal in number to the number of permanent magnets 20 comprising the rotor segment 16. Therefore, for each permanent magnet 20 comprising the rotor segment 16, a corresponding active magnetics module 28 is provided around the interior circumference 30 of the stator segment 26. It should be noted, however, that the example configuration shown in FIG. 6 may not always optimal, as more torque may be potentially generated than is required for an application, so fewer active magnetics modules 28 may be provided around the inner circumference 30 of the stator segment 26 than the number of permanent magnets 20 on the rotor segment 16.

As shown in FIG. 6, each active magnetics module 28 comprises a permanent magnet 32 and an electromagnet 34. Preferably, as shown in FIG. 6, the electromagnet 34 may be positioned between the permanent magnet 32 and the inner circumference 30 of the stator segment 26 such that the electromagnets 34 are radially adjacent to the permanent magnets 20 comprising the rotor segment 16 as the rotor 12 rotates.

The interposition of the electromagnet 34 between the permanent magnet 32 of the active magnetics module 28 and one of the permanent magnets 20 of the rotor segment 16 comprising the rotor 12 creates a magnetic interference point common to the magnetic fields from both permanent magnets and has a greater magnetic disturbing effect than any other location for the electromagnet. This is because any magnetic field generated between the two permanent magnets 20 and 32 modifies the magnetic centers of both permanent magnets at the same time.

If the magnetic path between the magnetic field source comprising the permanent magnet 32 of one of the active magnetics modules 28 and the nearest magnetic field source of the rotor 12 comprising one of the permanent magnets 20 of the rotor segment 16 is modified or interfered with by the electromagnet 34 of the active magnetics module, a force relative to the two arrays of permanent magnets will be generated. The interfering magnetic field can be generated by a current through a coil of the electromagnet 34 of the active magnetics module 28, for example. If the coil has a core of high permeability, the core not only intensifies the electrically generated magnetic field, but also provides a preferred magnetic path between the magnetic field sources of the adjacent permanent magnets 20 and 34. This allows the magnetic coupling between the two arrays of permanent magnets 20 and 34 to be kept very tight. By controlling the direction of the electric current through the coil of each electromagnet 34, the polarity of the generated magnetic field can either aid the magnetic coupling between the magnetic field sources comprising the permanent magnets 20 and 34 of the two arrays of permanent magnets or oppose the magnetic field coupling.

When the polarity of the electrically generated magnetic field aids the mutual coupling between the two arrays of permanent magnets 20 and 32, there are limitations to the magnitude of the imbalance of the two static array magnetic fields. The material that forms the magnetic core of the electromagnet 34 has a magnetic saturation level. This limits the level of the generated magnetic field to the difference between the core saturation level and the magnetic level of the static field conducted between the two arrays through the core. As an example, the core may have a saturation level of 1.5 Tesla, and the conducted field may have a strength of 1.0 Tesla. This leaves a dynamic range of 0.5 Tesla for the created magnetic field. An induced field change of 50% of the static field, while large, is relatively small compared to the original static magnetic field. If the polarity of the generated magnetic field opposes, or bucks, the static magnetic field between the field sources of the two arrays of permanent magnets 20 and 32, the strength of the generated magnetic field has a much higher dynamic range. In this example, the available dynamic range for the introduced dynamic field is 2.5 Tesla, a five-fold increase over the 0.5 Tesla of the previous example. This will result in the greatest amount of magnetic imbalance induced between the two arrays for any given magnetic saturation level of any magnetic core material.

A large number of active magnetic modules 28 is not required to obtain the desired operational performance. While persons skilled in the art will recognize that the use of a single active magnetics module 28 on each stator segment 26 will result in operation of the motor 10 and there is no performance penalty, there would nevertheless be an asymmetrical, constantly changing load on the bearings in which the rotor 12 is mounted to enable the rotor to rotate. Thus, in theory, although a design with only one active magnetics module 28 on each of the stator segments 26 may be constructed and operated, a torque unbalance problem may exist. It is therefore preferable that an even number of active magnetic modules 28 be utilized on each stator segment 26.

Considered in more detail, due to the symmetrical configuration of magnetic fields, there is symmetry in the operation of the active magnetics modules 28. When designing the magnetics of the motor 10, there is a more constant torque curve generated with an even number of phases compared to an odd number of phases. While utilization of an odd number of phases is viable, the variations of stresses and torque that is generated place additional demands on the physical structure of the motor 10 and result in greater vibration during operation.

Thus, by utilizing an even number of phases, the permanent magnets 20 comprising the rotor segment 16 of the rotor 12 may be employed more efficiently to produce smoother torque generation and avoid vibration. In this regard, for the purposes of this description only, an eight-phase configuration will be described. However, the described technique is applicable to any even number of phases.

Therefore, in accordance with one non-limiting example of the present invention, by providing dual active magnetics modules 28, offset by 180 degrees, on opposite sides of the rotor 12, the forces on the axis 18 of the rotor are symmetrical and purely rotational, which eliminates dynamic loads on the rotational bearings. Consequently, the forces acting upon the rotor 12 by the active magnetics modules 28 offset by 180 degrees result in the generation of rotational torque, and there is no induced vibration to the rotor as long as the two opposing active magnetics modules are operated at the same time and generate substantially the same amount of torque.

Also, as noted above, when the desired operational requirements are such that only a small number of pairs of active magnetics modules 28 is needed for the intended application, the incorporation of additional permanent magnets 20 on the rotor 12 results in unnecessary permanent magnets 20 in the rotational magnetics assembly. As an example, with just a single pair of active magnetics modules 28, each permanent magnet 20 of each circular magnetic array on the rotor segment 16 is acted upon by the active magnetics modules twice per rotation. This results in a physically larger motor and increased expense for construction.

Figure 7:
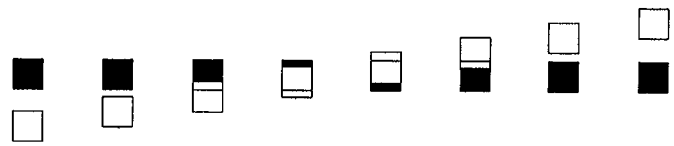
FIG. 7 illustrates the arrays of the permanent magnets comprising the rotor and the permanent magnets and electromagnets comprising the stator in accordance with a non-limiting example in accordance with the present invention during the process of being indexed during a power cycle.

By way of a non-limiting example in accordance with the present invention, FIG. 7 shows the relationships of eight active magnetics modules 28 (dark squares) comprising eight stator segments 26 to the permanent magnets 20 (light squares) comprising eight rotor segments 16 along the line 36 shown in FIG. 6 during one power cycle of a motor 10 having eight phases. For convenience, the relative positional relationships are shown in mid-cycle of a power cycle.

An array of active magnetics modules 28 is also provided at a position 180 degrees around the inner circumference 30 of the stator 14 from the array of active magnetics modules shown in FIG. 7 providing a second array of active magnetics modules that are arranged parallel to the axis 18 about which the rotor 12 rotates resulting in a pair of arrays of active magnetics modules mounted on opposite sides of the rotor. Also, for the purposes of the description of this example, the configuration comprises ten permanent magnets 20 positioned in an evenly spaced circular configuration around each of eight rotor segments 16 as shown in FIGS. 6 and 7. The rotor segments 16 are attached to a rotational shaft having the axis 18 and spaced sufficiently apart to reduce magnetic co-interference to acceptable levels.

By way of another non-limiting example in accordance with the present invention, the magnetic utilization of the permanent magnets 20 comprising the passive magnetics assembly may be increased. Consequently, the size of the motor 10 may be reduced by reducing the number of rotor segments 16 and corresponding number of stator segments 26.

Figure 8:
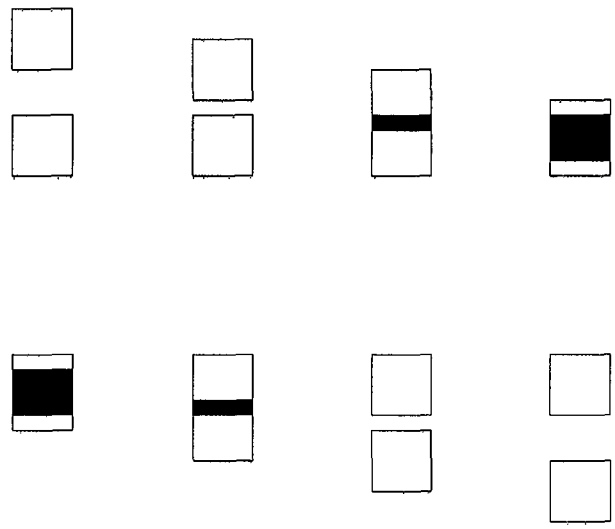
FIG. 8 illustrates the arrays of the permanent magnets comprising the rotor and the permanent magnets and electromagnets comprising the stator in accordance with another non-limiting example in accordance with the present invention during the process of being indexed during a power cycle.

Accordingly, as shown in FIG. 8, a motor 10 having four phases may be provided comprising four stator segments 26 each comprising a first pair of active magnetics modules 28. FIG. 8 shows the relationships of the first pair of active magnetics modules 28 (light squares) comprising each of four respective stator segments 26 to the permanent magnets 20 (dark squares) comprising each of four respective rotor segments 16 during one power cycle. For convenience, the relative positional relationships are shown in mid-cycle.

A second pair of active magnetics modules 28 is also provided at a position 180 degrees around the inner circumference 30 of each stator segment 26 from the first pair of active magnetics modules shown in FIG. 8 resulting in two pairs of active magnetics modules mounted on opposite sides of the rotor 12. Also, for the purposes of the description of this example, the configuration comprises ten permanent magnets 20 positioned in an evenly spaced circular configuration around each of four rotor segments 16 as shown in FIG. 6. This enables four-phase operation with only four rotor segments 16 and four stator segments 26.

This configuration results in a rotational arc of 36 degrees per power cycle. Each permanent magnet 20 of each rotor segment 16 is centrally mounted in a sector 22 of the rotor segment at 36-degree intervals around the circumference 24 of each rotor segment. Because the example has four phases per power cycle, this results in nine degrees per phase of magnetic operation. Since there are two pairs of active magnetics modules 28 comprising each of the four stator segments 26, a required arc offset of 18 degrees results. Accordingly, the physical positioning of the respective stator segments 26 is determined by the following relationships:

Arc of a power cycle=36 degrees (i.e., 360 degrees divided by the number of permanent magnets 20 on each rotor segment 16 (i.e., 10).

Pitch of the permanent magnets 20 on each rotor segment 16=4.5 degrees. Although offset between the array of permanent magnets 20 is described as 4.5 degrees or ½ the length of the magnet face, different offsets will also work, but with different operational characteristics. The strength and size of the magnetic fields of the permanent magnets 20 and 32 in addition to the cross-sectional area of the cores of the electromagnets 34 all come into play when selecting the number of permanent magnets 20 and number of steps for a phase.

Arc of travel induced by the active magnetics module 28 of each stator segment 26=18 degrees. This is nine degrees (arc of each phase of a power cycle) times the number of pairs of active magnetics modules 28 per stator segment 26, i.e., two in this example.

Angular placement offset between each pair of active magnetics modules 28 on each stator segment 26: 36+27=63 degrees. This is the arc of a power cycle plus three times the arc of each phase.

The relative position of the active magnetics modules 28 on the stator segments 26 based on the angular placement offset between the active magnetics modules enables proper operation.

In accordance with the present invention, when the number of phases equals the number of active magnetics modules 28, the result is a minimal design version. The minimum number of permanent magnets 20 on the rotor 12 is the number of phases plus the number of active magnetics modules 28. Therefore, a motor 10 having a pair of active magnetic modules 28 on each of two stator segments 26 configured for four phases requires a minimum of eight permanent magnetics 20 on each rotor segment 16; more may be utilized, but they are not needed for such a motor to be operational.

Figure 9:
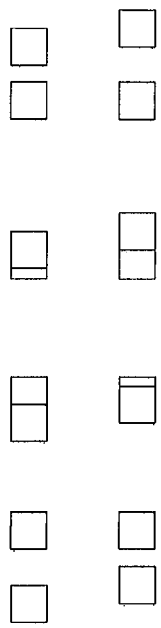
FIG. 9 illustrates the arrays of the permanent magnets comprising the rotor and the permanent magnets and electromagnets comprising the stator in accordance with a further non-limiting example in accordance with the present invention during the process of being indexed during a power cycle.

Alternatively, two stator segments 26 each having four pairs of active magnetics modules 28 may be provided to reduce the number of rotor segments 16 and stator segments 26 described in conjunction with FIG. 8 to provide an even more compact motor 10, as shown in FIG. 9. FIG. 9 shows the relationships of two pairs of active magnetics modules 28 (light squares) comprising two respective stator segments 26 to the permanent magnets 20 (dark squares) comprising two respective rotor segments 16 during one power cycle of a four-phase motor 10. For convenience, the relative positional relationships are again shown in mid-cycle.

Two additional pairs of active magnetics modules 28 are also provided at a position 180 degrees around the inner circumference 30 of each stator segment 26 from the two pairs of active magnetics modules shown in FIG. 9 resulting in four pairs of active magnetics modules mounted on opposite sides of the rotor 12. Also, for the purposes of the description of this example, the configuration comprises ten permanent magnets 20 positioned in an evenly spaced circular configuration around each of four rotor segments 16 as shown in FIG. 6. This enables four-phase operation with only two rotor segments 16 and two stator segments 26. Consequently, the motor 10 may be constructed in a compact manner utilizing a smaller number of rotor segments 16 and stator segments 26. Therefore, an even division of the number of phases will allow a reduction in the number of rotor segments 16 and stator segments 26.

By way of one non-limiting example, the control system described in U.S. Pat. No. 8,089,187 may be utilized to control the electromagnets 34 of the active magnetics modules 28 during operation of the motor 10. Generally, the control system provides switching of the electromagnets 34 that create temporary magnetic fields to control the position of the rotational magnetic assembly, relative to the stationary permanent magnets and electromagnets assembly, as required.

In addition to knowing when to switch the electromagnets 34 on and off, the current through each electromagnet should be controlled for maximum efficiency and for good acceleration and dynamic braking. The response time of the electromagnets must be factored into the switching times for optimal operation over the widest possible RPM range. Due to the requirements of fast magnetic field generation and decay times, low resistance/low inductance electromagnets 34 are preferably used.

Figure 10:
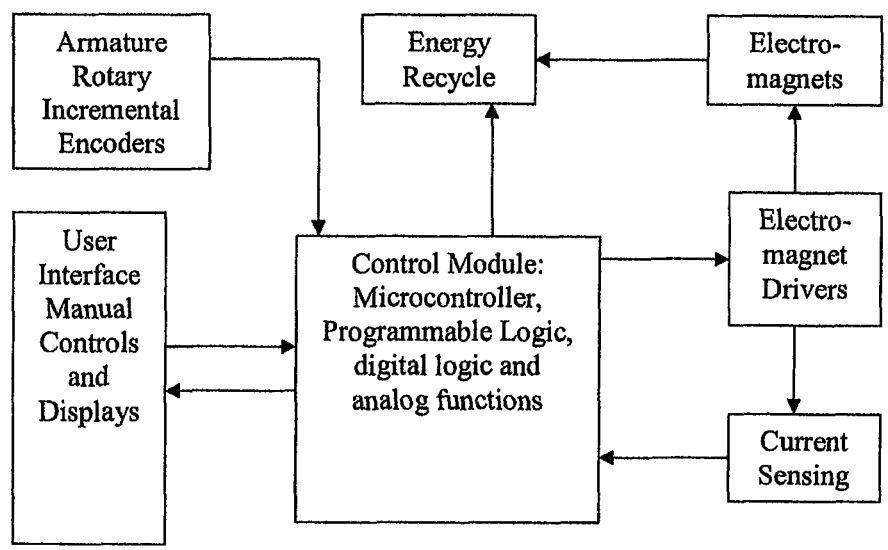
FIG. 10 is a block diagram of the functional blocks of a control system utilized in a non-limiting example in accordance with the present invention.

FIG. 10 is a block diagram of the functional blocks of the control system. As shown in FIG. 10, the control system comprises a rotational magnetic assembly rotary incremental encoders module and the controlling electronics. Preferably, the rotational magnetic assembly rotary incremental encoders module includes a pair of rotary incremental encoders, namely, a relative encoder with an index output and an absolute rotary encoder. The encoders may be used to derive both RPM and instantaneous positional information in addition to rotational direction. The incremental encoders provide very high positional resolution and automatically compensate for acceleration/deceleration conditions.

Controls to provide direction, power, and RPM control functions may be implemented in a combination of microprocessors, analog functional components, and solid-state logic. The direction of rotation is detected by the phase relationship between the two pulse sources, Phase A and Phase B. When starting, the absolute encoder is read to determine the actual position of the rotational magnetic assembly, and the startup sequence is adjusted accordingly. After starting, the absolute encoder is used to double-check the incremental encoder operation.

The control system also comprises a user interface manual controls and displays module, as shown in FIG. 10. There are preferably manual controls to turn the system on and off, control shaft speed, perform diagnostics, and to provide displays to show RPM, power consumption, and other operational parameters.

The electromagnets of the control system shown in FIG. 10 are the devices that are used to modify the strength and shape of the magnetic fields from the permanent magnets. There is one for each stationary permanent magnets and electromagnets assembly 28 shown in FIG. 6.

The electromagnets 34 are preferably low-resistance coils wound on a ferrite core. Such electromagnets provide a trade-off between low inductance for fast response times and lower currents for efficiency. By keeping the coil resistance in the range of approximately a few milliohms, the voltage drop due to resistance is maintained very low. As an example, 0.00428 ohms resistance with 100 A flowing through it results in a resistive voltage drop of 0.428 V and a power dissipation of 42.8 W. It is the inductive reactance that is used to limit the current through the electromagnets 34 and that dissipates no energy. Due to the presence of stationary magnetic fields and the dynamics of the generated magnetic field, calculating the inductance of an electromagnet is not possible as it is not a constant. If the polarity of the generated magnetic field is opposite to the permanent magnetic field, the initial inductance of the electromagnet is lower than when the field polarities are the same.

The electromagnet drivers included in the control system shown in FIG. 10 are solid-state current switches that control the magnitude and direction of the current through the electromagnets 34 and, hence, the generated magnetic fields.

The energy recycle module of the control system shown in FIG. 10 functions when any electromagnet is turned off so the energy stored in the magnetic field is dumped back into the power supply. The energy recycle module partially recovers the energy used to generate the temporary magnetic field.

Energy recovery from the electromagnets 34 is employed to increase the operational efficiency. The currents flowing in the electromagnets 34 typically range from approximately 50 to 200 A. The magnetic field generated by a given electromagnet is required for a very short time, for example, from less than a millisecond (0.001 second) to a few tens of milliseconds during normal operation. During start-up is the only time that current pulse durations are typically longer. When the field from the electromagnet is not required, the energy stored in the magnetic field is recovered and dumped back into the power supply. There are large capacitors, each several tenths of farads, that are used to store the recycled energy.

The strength of the magnetic field created by one of the electromagnets 34 is directly related to the current flowing through it. The current sensing module included in the control system shown in FIG. 10 allows the control system to measure the current through any coil. This allows the control system to regulate the strength of the generated magnetic fields. Pulse width modulation of the coil currents is preferably used for increased efficiency.

The control module of the control system comprises a microcontroller, as shown in FIG. 10 and is further described in U.S. Pat. No. 8,089,187. There are three operational modes, Start, Run, and Brake. The microcontroller provides operational parameters to the rotational magnetic assembly control logic and commands the transition from Start to Run.

Direction of rotation of the rotational magnetic assembly is dependent on the sequence in which the electromagnets 34 are energized and de-energized. Only two directions are possible, and consequently only two sequences are required.

The difference between Start and Run is that in the Start mode the current control is initially set to maximum power and is subsequently reduced to a level to maintain idle RPM after motion has been established. In the Run mode, the system regulates the power to the electromagnets 34 to maintain a selected RPM.

Running differs from the Start mode by adjusting power to the electromagnets 34 to maintain a selected RPM in the Run mode. If the RPM is higher than desired, the power to the electromagnets 34 is reduced until the RPM drops to the required speed. The control system can also enter the Brake mode to reduce the RPM if that characteristic is desired. If possible, the control system uses just the leading electromagnet to maintain speed or accelerate to the selected RPM. The control system makes the decision of when to use the trailing electromagnet to aid the leading electromagnet.

To operate with dynamic braking in the Brake mode, the polarity of the electromagnets 34 is reversed from the polarity employed for the Run mode. The current through the electromagnets 34 determines the dynamic braking force.

Since the positions of all the magnets are known, the count for the energizing or de-energizing of each electromagnet 34 corresponds to a unique count value. The control system shifts these count values depending upon the mode of operation. For each rotor diameter, size of magnet, and magnetic step size, the transition points may thus be uniquely located.

An example of an indexing step, for a simple step, will now be described. The values used in this example are exemplary only, but the sequence is accurate no matter what size the rotational magnetics assembly is or what the pitch of the permanent magnets 20 is. Suppose the index count for the originating magnetic center is 350. Also, suppose that the index count for the next magnetic center is 406. The index count for turn-on of the electromagnet between originating and target magnetic centers may thus be 320. This value is dependent upon rotational magnetic assembly RPM as it compensates for the magnetic field build-up time. Furthermore, the index count for termination of electromagnet current and start of energy recovery cycle may be 380. The energy recovery cycle is terminated when the recovered current drops below 10% of peak electromagnet current. Finally, the index count for turn-on of the electromagnet between the new originating and target magnetic centers may be 370. After stepping through all the magnetic index centers the sequencing pattern is repeated again.

Figure 11:
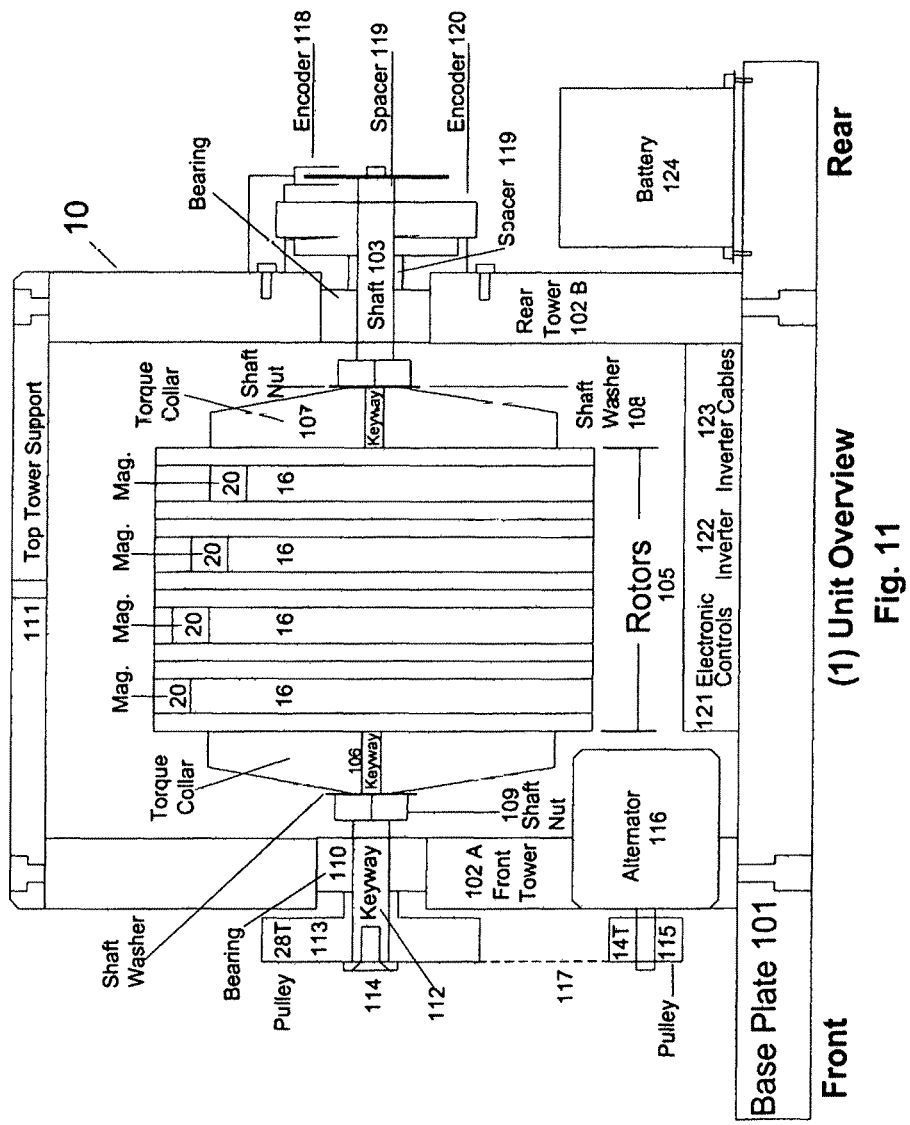
FIG. 11 is a breakaway side view of a portion of a motor in accordance with an example of the present invention.
Figure 12:
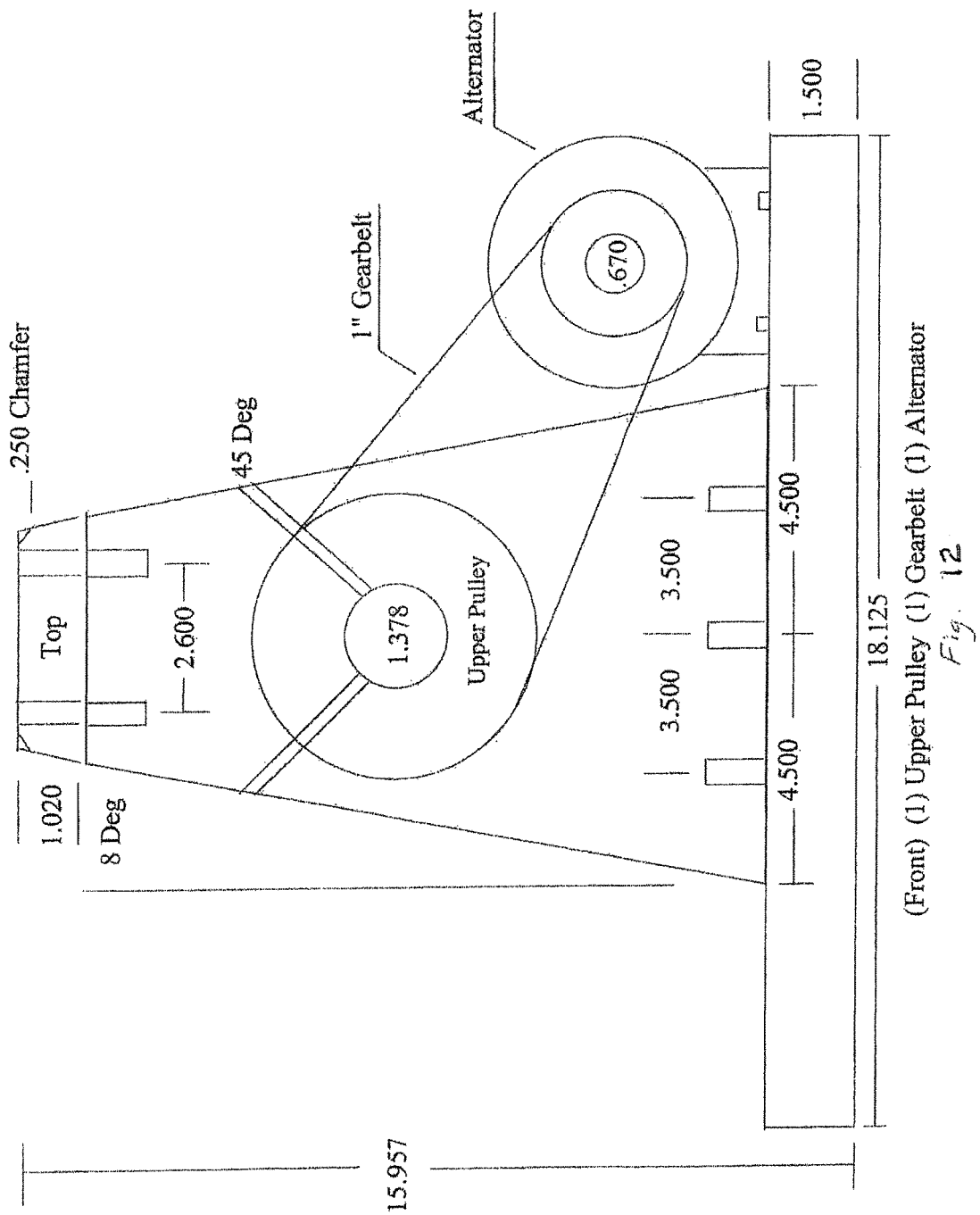
FIG. 12 is a front end view of the motor shown in FIG. 11.
Figure 13:
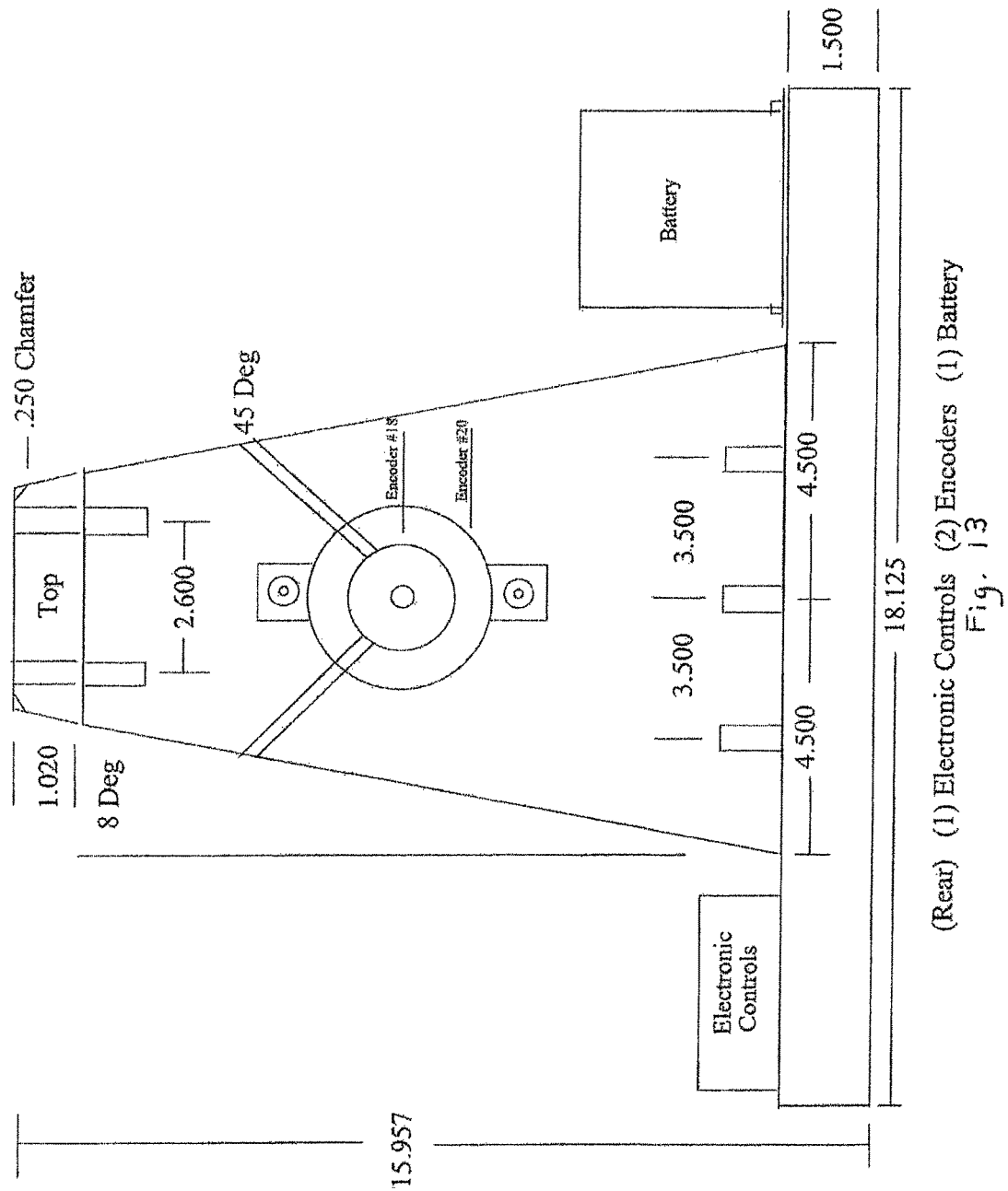
FIG. 13 is a rear end view of the motor shown in FIG. 11.

A non-limiting example of the motor 10 in accordance with the present invention comprising the permanent magnet/electromagnet structure and magnetic field control system will now be described in more detail with reference to FIGS. 11 through 14. As shown in FIG. 11, the motor 10 comprises a base plate 101. As shown in FIGS. 11 and 12, a front tower 102A is mounted to the base plate 101. Similarly, as shown in FIGS. 11 and 13, a rear tower 102B is mounted to the base plate 101. A main shaft 103 is rotatably supported by the front and rear towers 102A and 102B.

A rotational magnetics assembly 105 comprising a plurality of rotor segments 16 having permanent magnets 20 is mounted to the main shaft 103, as shown in FIG. 11. For example, the rotational magnetics assembly 105 may comprise four rotor segments 16. The respective ends of the rotational magnetics assembly 105 are provided with a torque collar keyway 106 that receives a key on the main shaft 103. As shown in FIG. 11, torque collars 107, shaft washers 108, and shaft nuts 109 are utilized at the respective ends of the rotational magnetics assembly 105 to secure the rotational magnetics assembly to the main shaft 103.

The main shaft 103 is rotatably mounted in bearings 110 disposed in the front and rear towers 102A and 102B. The front and rear towers 102A and 102B may be reinforced by a top tower support 111.

A keyway upper pulley 112 and an upper gear belt pulley 113 may be mounted to the main shaft 103, as shown in FIGS. 11 and 12. An upper gear belt holding washer 114 maintains the upper gear belt pulley 113 on the main shaft 103. Additionally, a lower gear belt pulley 115 is mounted to the shaft of an alternator 116 secured to the base plate 101 proximate the base of the front tower 102A. The alternator 116 may be a Model GM AD244 alternator available from HO Alternators, Inc. located in Davenport, Iowa. A gear belt 117, which may be a Browning HPT belt, interconnects the upper and lower gear belt pulleys 113 and 115, as shown in FIGS. 11 and 12.

A shaft end play spacer 119 is mounted to the opposite end of the main shaft 103 from the upper and lower gear belt pulleys 113 and 115. One or more encoders 118, 120 are mounted to the main shaft 103.

Electronic controls 121 and an inverter 122 connected to the alternator 116 are mounted to the base plate 101, as shown in FIGS. 11 and 13. The inverter 122 may be a Vector Model VEC056D 2500 watt power inverter. Inverter cables 123 electrically connect the alternator 116 to the inverter 122, and the inverter is in turn connected to a rechargeable battery 124 mounted to the base plate 101. The inverter cables 123 may be Vector Model VEC085D power inverter cables, and the battery 124 may be a Model 75/25 available from Optima Batteries, Inc. located in Aurora, Colo.

Figure 14:
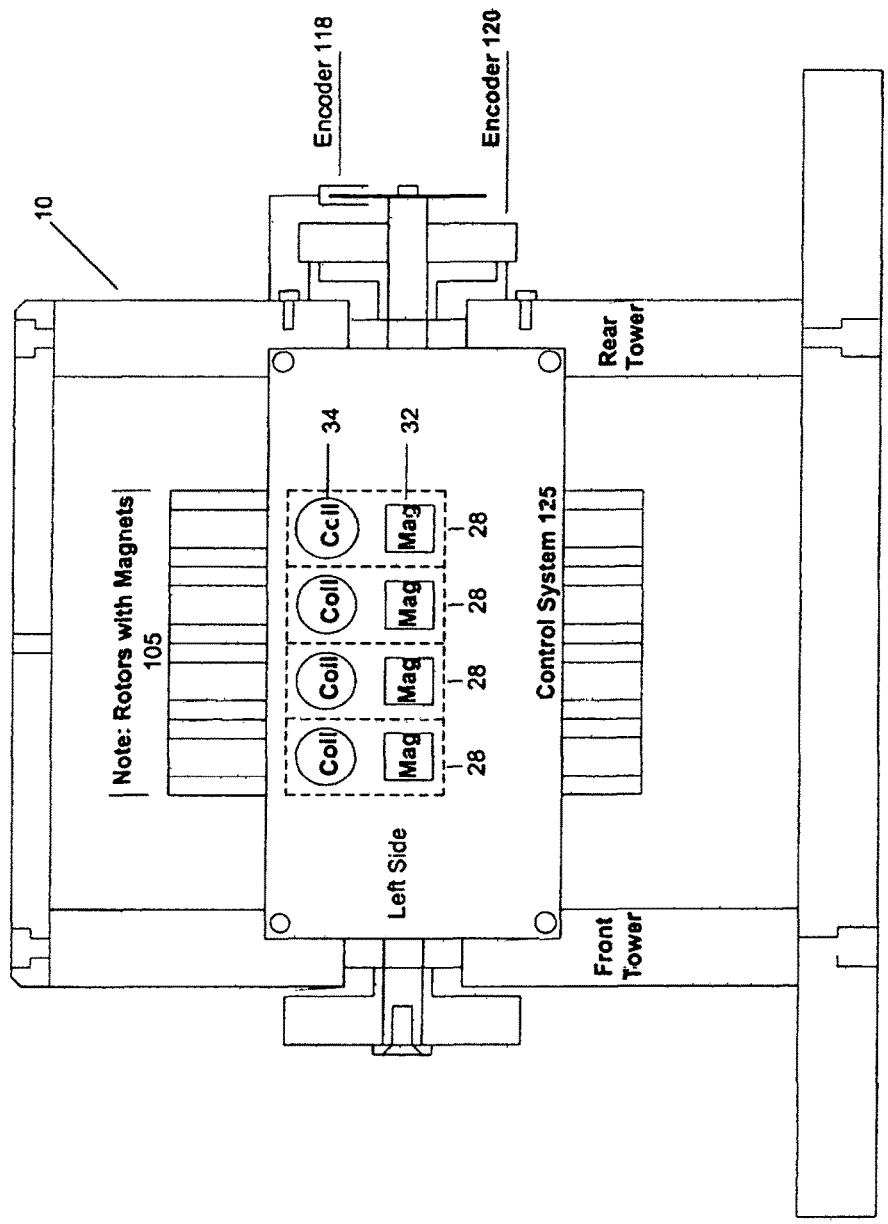
FIG. 14 is a side view of a portion of the motor in accordance with the example of the present invention.

As shown in FIG. 14, the motor 10 further comprises a stationary permanent magnetics and electromagnetics assembly and control system 125 mounted to each side of the front and rear towers 102A and 102B. Each stationary magnetics and electromagnetics assembly and control system 125 comprises a plurality of stator segments 26 having an active magnetics modules 28 comprising a permanent magnet 32 and an electromagnet 34. For example, there may be four stator segments 26 incorporated into the stationary magnetics and electromagnetics assembly and control system 125.

As described earlier, the basic architecture of the magnetic field control system 125 comprises an FPGA used for acquiring positional information from both an incremental encoder 118 and from an absolute encoder 120, as shown in FIGS. 10 and 14. The data produced by the absolute encoder 120 is preferably in parallel format, but may be in a serial format. The absolute encoder 120 data is preferably 12-bit parallel data which is latched in at a 100 kHz rate. At starting and low RPMs, the absolute encoder 120 data is used, but above a certain RPM, operation changes over to the incremental encoder 118 due to the relative response times.

The incremental or indexing encoder 118 is preferably a 12-bit resolution quadrature encoder. Obtaining higher resolution for incremental encoders is easier than for absolute encoders. The incremental encoder 118 provides a pulse each step, and the phase carries directional information. It is preferred if there is an indexing pulse to flag rollover. This way any error can only affect one rotation, and errors do not accumulate.

The encoders 118 and 120 need to be phased properly, and a timing mark is the preferred approach. An LED may be utilized, but the response times have to be verified before one can be used as a strobe. The strobe function should be built in, with no externally supplied test equipment needed. Because the encoders 118 and 120 have 12-bit resolution, this yields 4096 locations around the circumference of the rotational magnetics assembly 105. This divides the rotational magnetics assembly 105 into 0.087890625-degree increments. It is 5.2734375 minute of arc per pulse and 11.37777 . . . pulses per degree of arc. Each diameter of the rotational magnetics assembly 105 will have to be worked out as to how may increments it is between poles, phases, and pulse duration measurements. If needed, a timer may be utilized for more accurate duration times, but simple increments are preferred with adjustment of the current using PWM to obtain the required field strength.

Field buildup time may have to be compensated. This means that at low RPM, calculated timing points can be used with no compensation, but at higher RPM, the field lag will have to be figured in and the field will be energized and removed sooner than direct calculations indicate.

The control system 125 shown in FIG. 14 comprises a position transition module to compare the new value with the last stored value, and if there is a difference, a "possible change" flag is set and the new value is loaded in a temporary register. On the occurrence of the next clock, the new and the temporary values are compared. If they are the same, then a "possible" flag is cleared, and a "new position" flag is set. This is used to cause any other module to check for positional changes. This flag is then cleared with the next positive position compare. Each module resets its own private flag bit. The position codes are resident in compare registers, and the position data is derived from them. In this manner, a code change is verified before it is presented to the remainder of the control system 125. Also, the new and old codes are compared to derive direction.

The timing of the active control and drive power levels is also handled by the FPGA. The power level, either PWM or shortened pulse duration, is established externally and loaded into parameter registers for use by the control system 125. The control system 125 handles transitions between phases and pole commutation.

As described earlier, there are three distinct operational functions or modes, namely, Start, Run, and Stop. The Start mode has control until the rotational magnetics assembly 105 has achieved the selected RPM. Start is the same as Run, except that maximum power level is preferably initially used and then scaled back at the selected RPM setpoints. At the beginning of the Start mode, power is at maximum, and preferably the control system 125 starts scaling back at 50%, 75%, and finally converts to idle power levels at 100% of idle RPM. To slow down rotation, the reverse electromagnets may be energized instead of the forward electromagnets. In the Stop mode, the control system 125 preferably applies full power so that the rotation of the rotational magnetics assembly 105 is reversed until all motion is stopped. When the rotational motion has stopped, the rotational magnetics assembly 105 is preferably placed in the "locked rotor" condition for a short period to halt all residual motion.

Definable but static parameters are stored in non-volatile EEPROM and loaded into the FPGA at power-up. Parameters include Idle RPM and Forward and Reverse definition. Direction of rotation of the rotor 12 is definable.

A rotary configuration in accordance with the various examples of the present invention comprising at least two rotor segments 16 and at least two stator segments 26 is useful for many applications where size of the motor 10 imposes a constraint. A non-limiting example of a method in accordance with the present invention to construct a rotary configuration comprising two or more rotor segments 16 and two or more stator segments 26 requires consideration of several interdependent factors and relationships. The size of the magnetic field sources and their strengths are part of the spacing constraints. The granularity of the magnetic field source arrays is also a consideration, as that is a factor in determining the length of the arrays. Also, a decision is needed whether to have magnetic discontinuities to induce a step function into the interaction between the magnetic field source arrays or to have a uniform interaction with no step function. A decision is also needed whether to use attracting or repelling magnetic field source arrays. Attracting magnetic field source arrays allow greater forces to be generated, but the performance of repelling magnetic field source arrays may be desirable for some applications.

Figure 15:
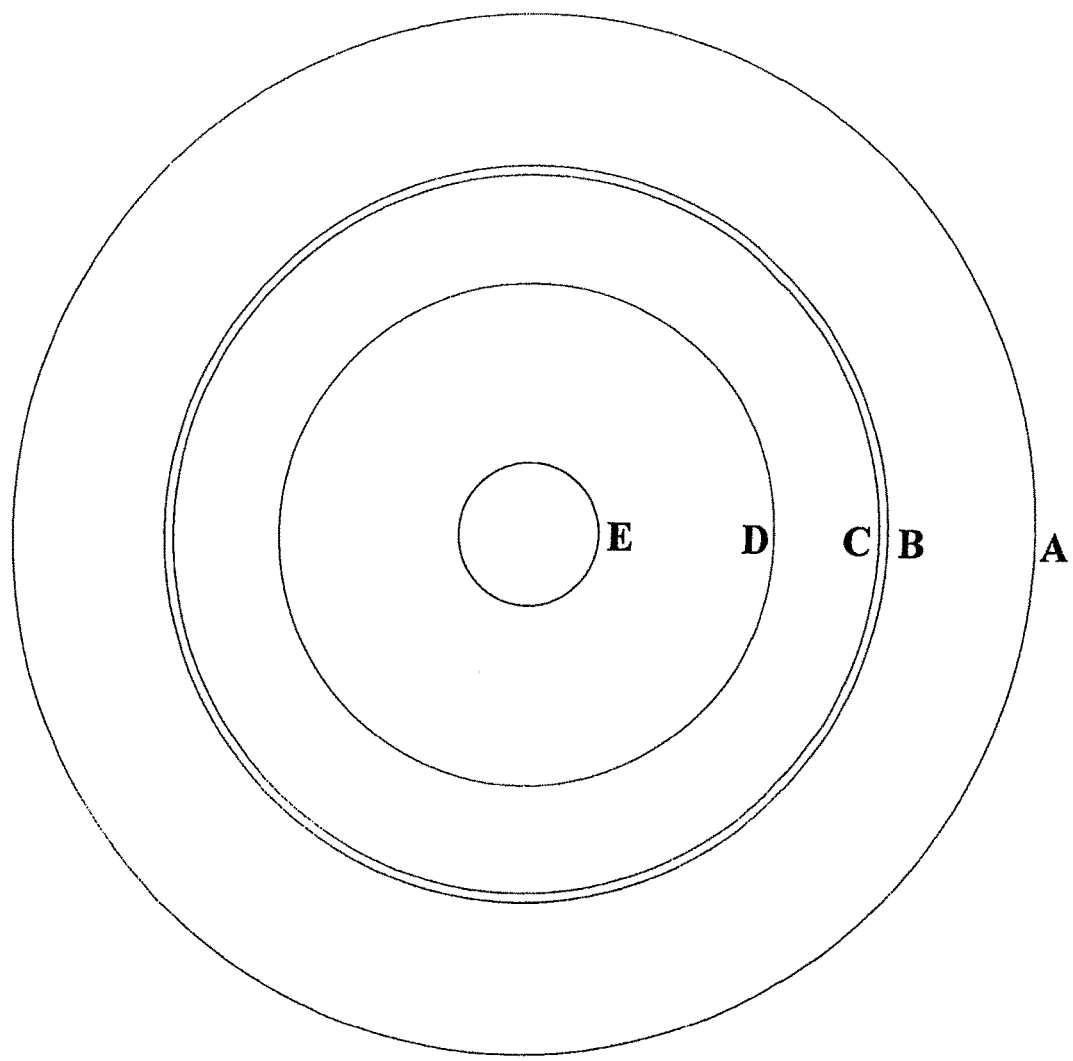
FIG. 15 shows a conceptual diagram of a rotary configuration in accordance with the various examples of the present invention comprising at least two rotor segments and at least two stator segments.

To design a rotary magnetic field source array configuration, some boundaries or surfaces must initially be defined. FIG. 15 shows the important preliminary boundaries which need to be defined. Typically, the center structure is designed to rotate, and the outer structure is stationary. This is because permanent magnets are lacking in any control functions, either electrical or mechanical. The outer structure possesses these control functions and having them located in a stationary structure is simpler to implement and has higher reliability.

As shown in FIG. 15, the center circle labeled E represents a shaft which supports the rotating components. The shaft must be stiff enough for the length that is required and the mechanical load that is represented by the region between circles C and D. The region between element E and element D can be a non-magnetic metal or composite material such as G-10. This region can be a hollow construction rather than a solid mass. How much of a flywheel effect is desired will be a factor in the selection of the construction of this indicated region. The cylindrical region bordered by elements C and D contains the permanent magnets comprising the required magnetic field source arrays of the rotor. The region between B and C is a physical clearance gap between the rotor and the stationary magnetic field source array of the stator defined by the boundaries A and B. The region between A and B is where the accompanying magnetic field source array and the sources of the required temporary magnetic fields are located.

The circumference of boundary C is the first dimension to quantify, as all other dimensions are referenced to it. The controlling factors of the circumference of the rotor are the size of the permanent magnets, the granularity of the magnetic field source array comprising the rotor, the number of elements of the array, and the number of magnetic sub-arrays that comprise the loop around the circumference. The latter factor can be grouped into three major factors. These are the number of sub-arrays, the sub-array repetition length, and the length of the sub-array, defined by components of and the characteristics desired of the sub-array.

Figure 16:
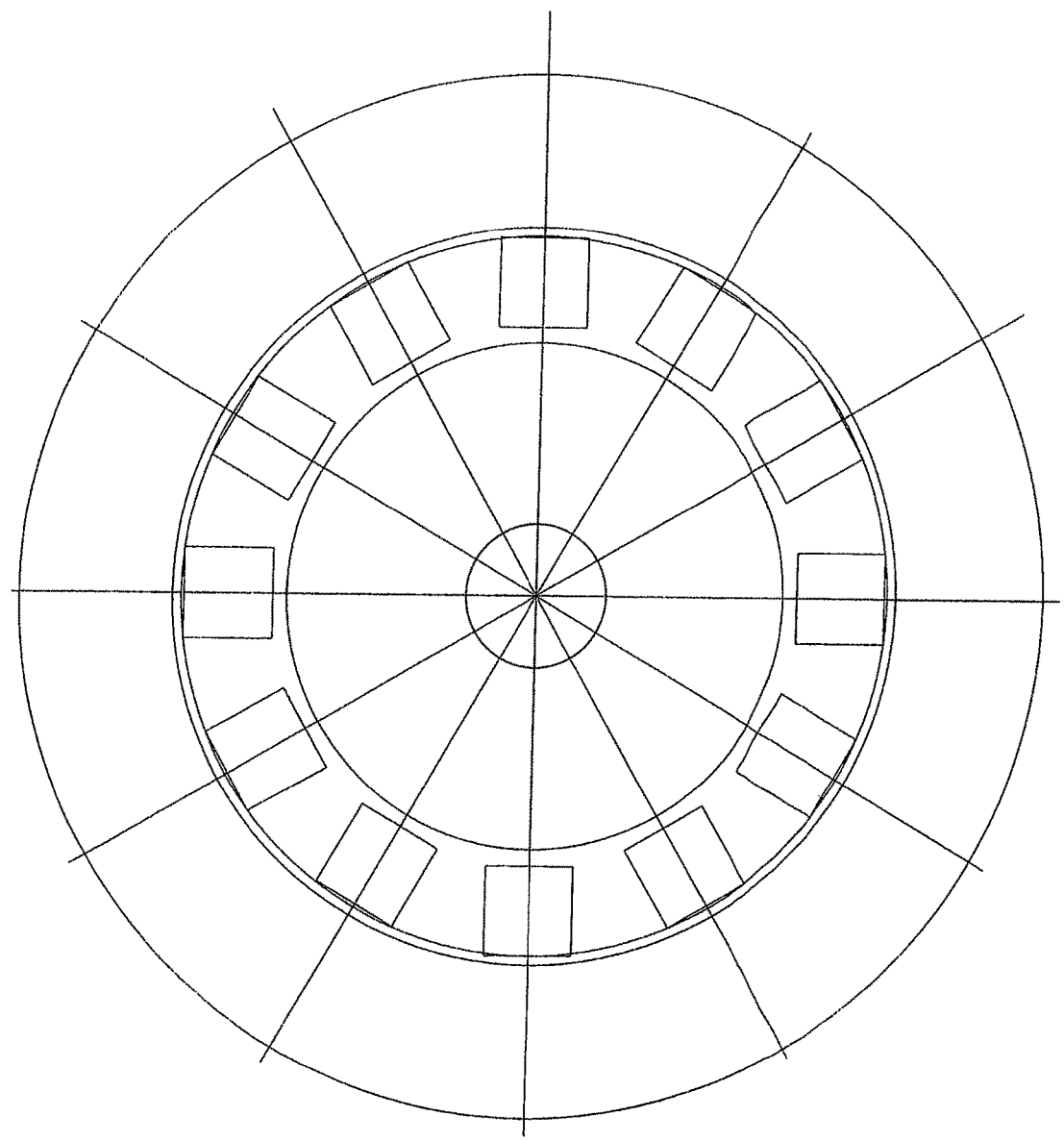
FIG. 16 shows an example of a rotor segment comprising a rotational magnetics assembly for the rotary configuration shown in FIG. 15.
Figure 17:
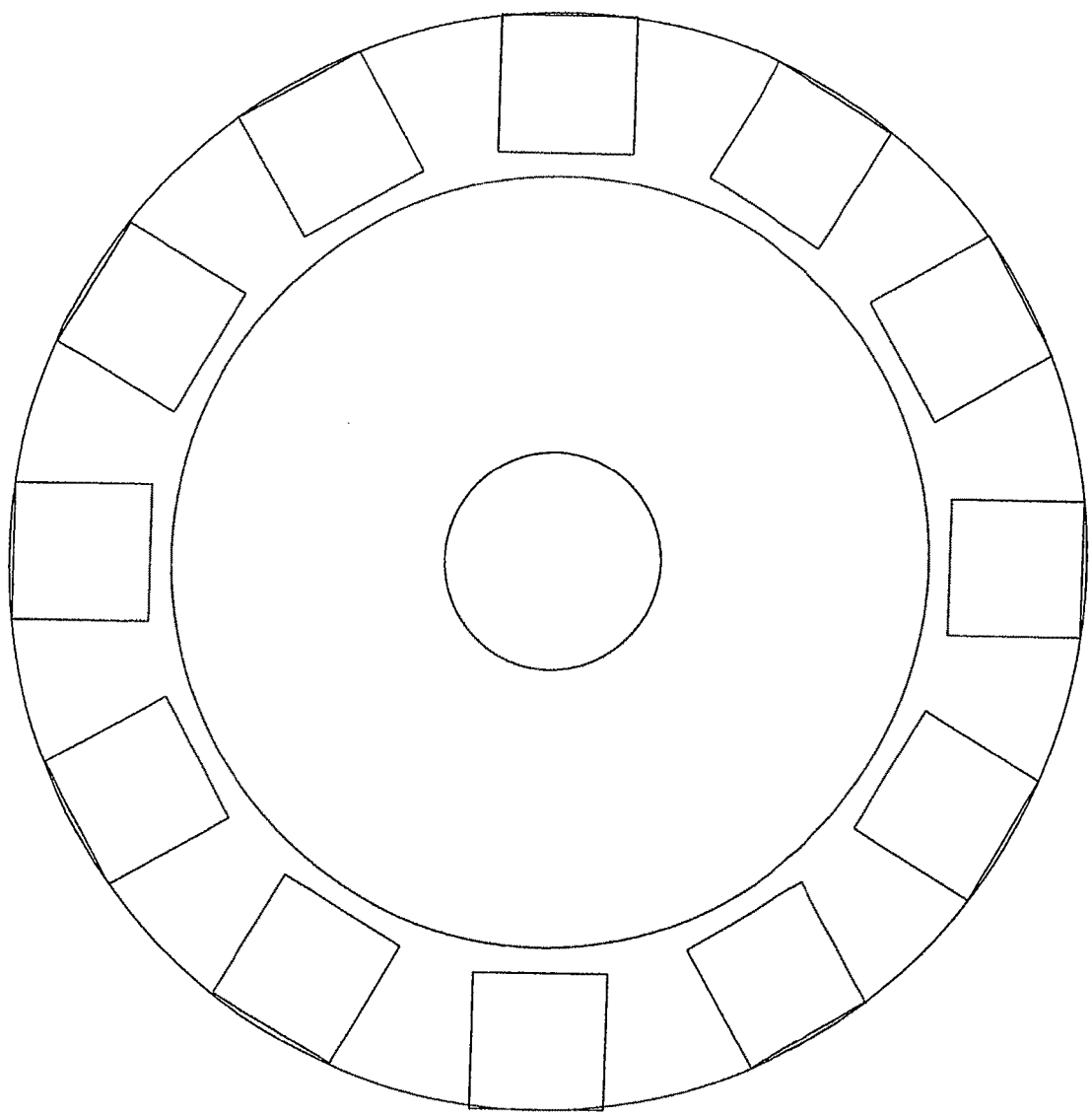
FIG. 17 shows the final structure for the example of the rotor segment shown in FIG. 16.

FIG. 16 shows a non-limiting example of an inner rotational magnetics assembly. There are twelve permanent magnets represented by the squares, which places one magnet every 30 degrees: 30 degrees*12=360 degrees. This can be divided into 2, 3, 4, or 6 sub-arrays, depending upon the number of sub-arrays comprising the outer stationary magnetics and electromagnetics assembly. FIG. 17 shows the final structure for this example of the example inner rotational magnetics assembly. All the angle reference lines and the outer construct delimitation circles have been removed.

Figure 18:
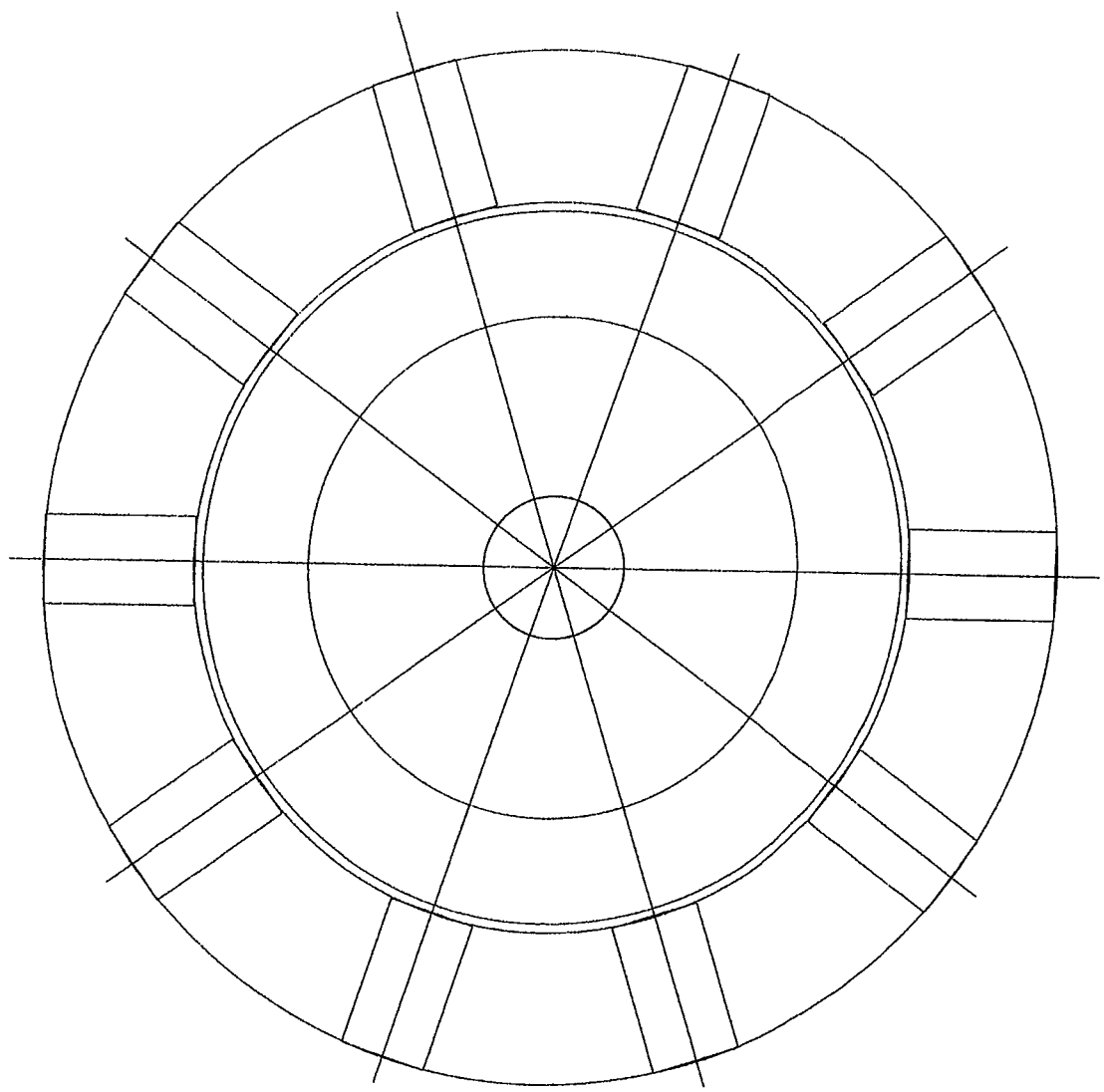
FIG. 18 shows an example of a stator segment comprising a stationary magnetics and electromagnetics assembly for the rotary configuration shown in FIG. 15.
Figure 19:
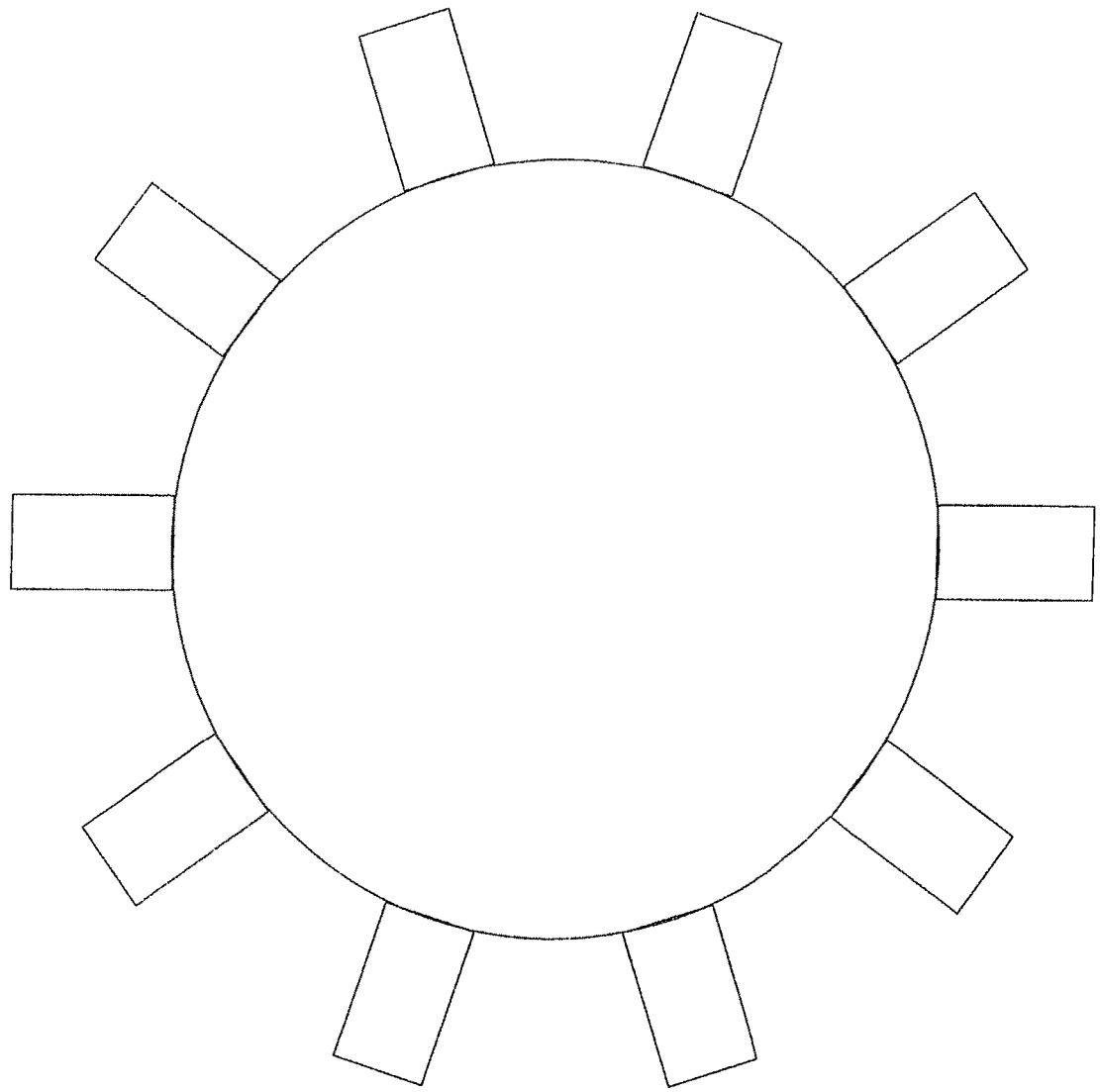
FIG. 19 shows the final structure for the example of the stationary magnetics and electromagnetics assembly shown in FIG. 18.

FIG. 18 shows an outer stationary magnetics and electromagnetics assembly. In this example, a sub-array length of six has been chosen for the purposes of description. The result is ten controllable active magnetics modules represented by the rectangles to be arranged along the inside diameter of the outer stationary magnetics and electromagnetics assembly. This results in one controllable magnetic field element every 36 degrees: 36 degrees*10=360 degrees. FIG. 19 shows the structure of the outer stationary magnetics and electromagnetics assembly with all the degree marks and the delimiters removed for clarity.

Figure 20:
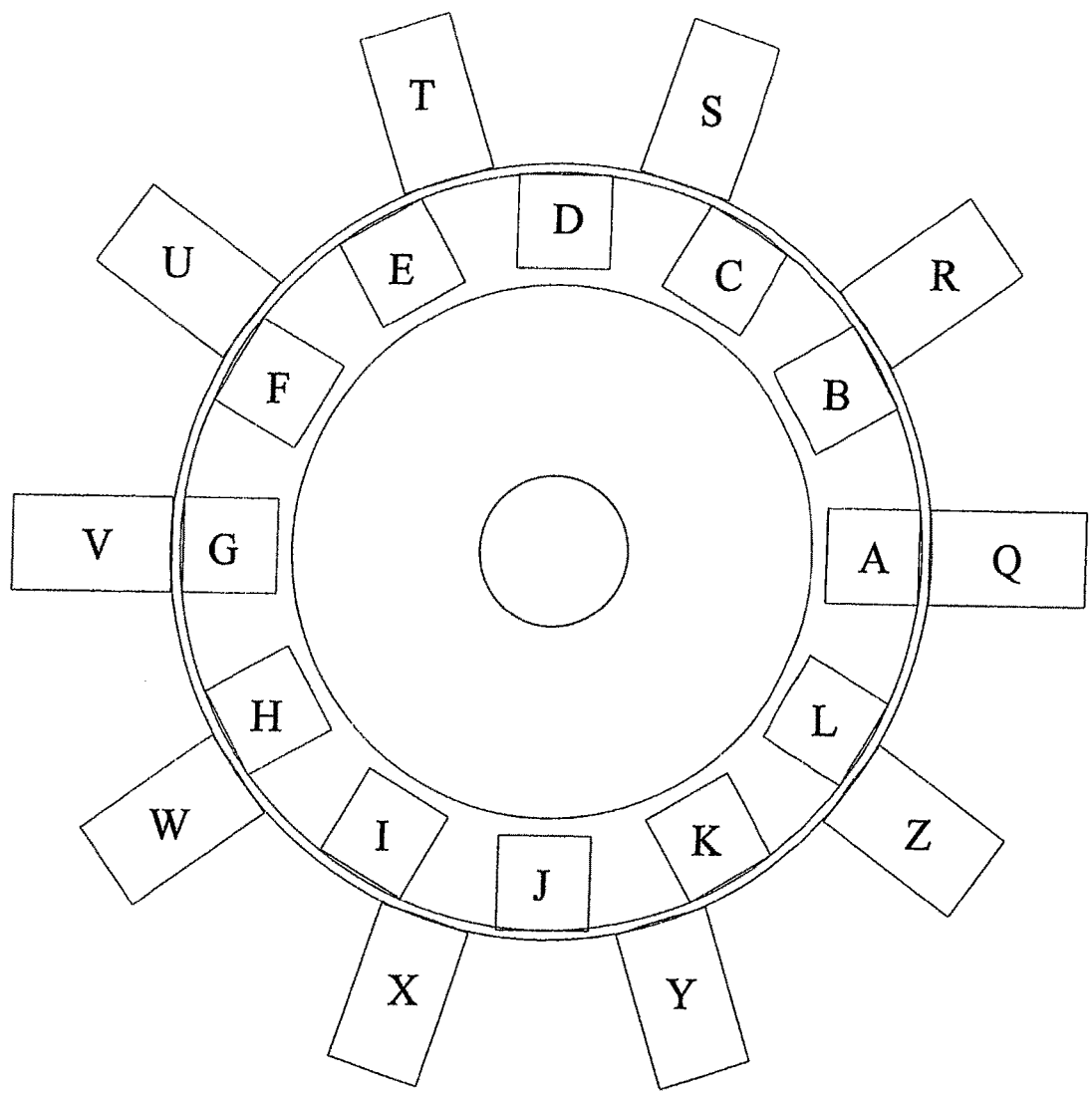
FIG. 20 shows how the inner and outer structures of FIGS. 17 and 19 are combined and a starting position of the rotational magnetics assembly for clockwise movement.

FIG. 20 shows how the inner and outer assemblies are combined to construct one rotor segment 16 and the corresponding stator segment 26. The alignment between the two assemblies demonstrates a magnetically stable alignment. All magnetic sources are labeled for tracking the magnetic steps in the following description in conjunction with FIGS. 20 through 31. For the purposes of description, a simplified control sequence will be considered. A more complicated drive sequence is contemplated, in which more than one outside array static magnetic field is dynamically altered and the timing of control pulses is controlled to limit their application over the effective arc. There are actually two magnetic sub-arrays that preferably comprise the inner and outer assemblies and for simplicity just one of the arrays will be driven. The other array will contribute a higher load for the induced motion to overcome, but for the purposes of description, it will be assumed that the force generated by the temporary interfering magnetic field is sufficient to overcome the additional magnetic load. Additionally, for the purposes of description, the magnetic contours of the inner and outer magnetic field source arrays are considered to be non-uniform.

When an element of the outer controllable magnetic field array is energized to induce motion, the element of the outer controllable magnetic field array directly opposite to such element may also be energized to drive the second sub-array, as that is the appropriate drive element of the opposite sub-array. Additional outer elements of a sub-array may also be energized to aid the primary drive element of the sub-array for a step when the physical alignment is correct for the generation of a force aiding the desired rotational direction.

FIG. 20 shows a starting position in the present example. This is a magnetically stable arrangement for the two circular magnetic field source arrays in an attracting or repelling orientation. For simplicity, repelling arrays will initially be described. If the strengths of the static magnetic fields are such that there is a non-uniform magnetic field associated with the sub-arrays, there is a noticeable self-indexing action between the inner and outer magnetic field source arrays. The example shown in FIG. 20 illustrates a magnetically stable starting position for the two magnetic field source arrays with repelling magnetic fields where the applied temporary magnetic unbalancing fields are generated in a sequence and manner to cause counterclockwise motion of the inner sub-arrays.

Figure 21:
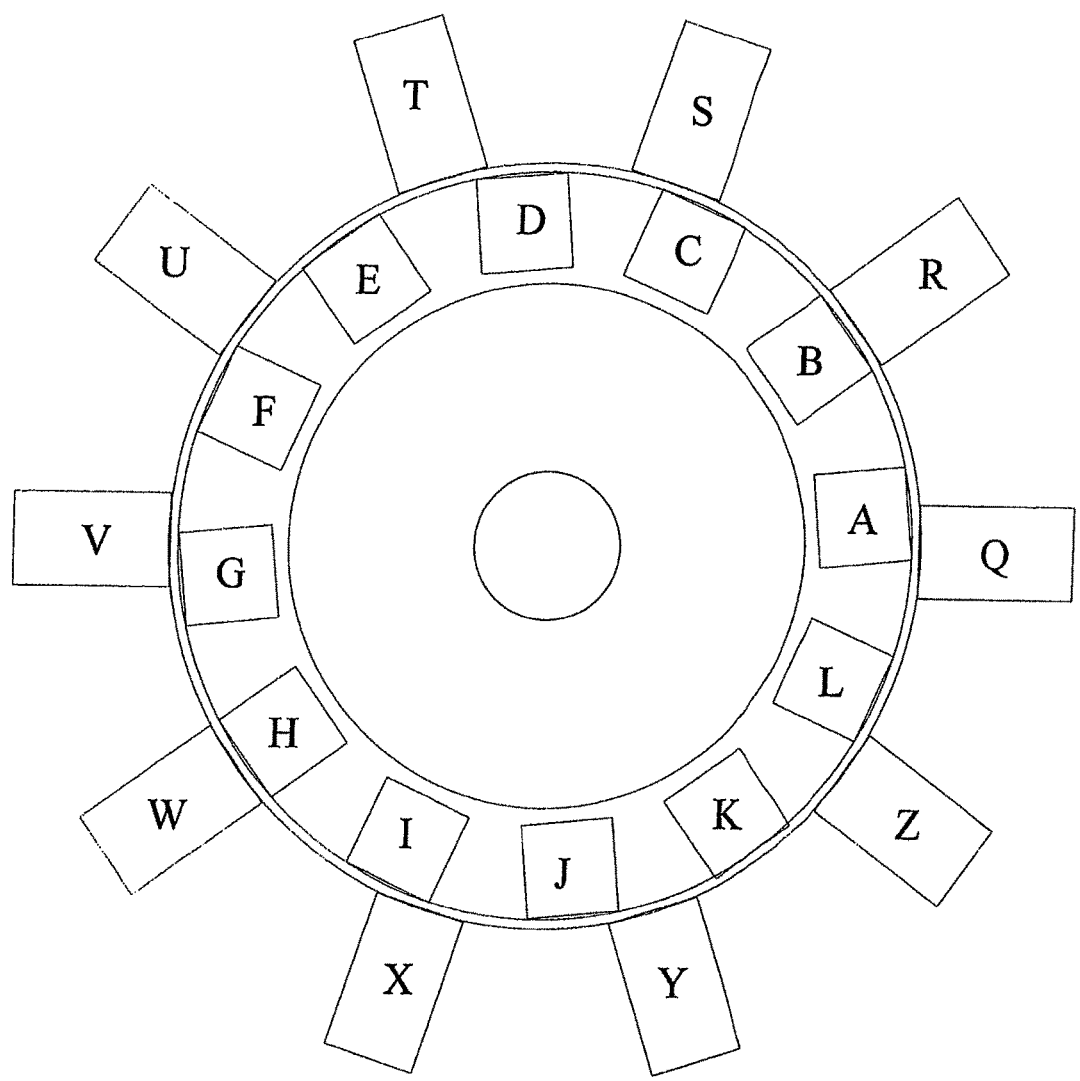
FIG. 21 illustrates initial relative counterclockwise movement of the rotational magnetics assembly of the rotary configuration shown in FIG. 20.

FIG. 21 illustrates the movement of the inner array when outer array element U has been subjected to a magnetic pulse from its in-line magnetic element resulting in a repelling force to be exerted between element U of the outer array and element F of the inner array. The duration of the pulse is such that the temporary magnetic field dissipates by the time elements R and B are in magnetic balance.

Figure 22:
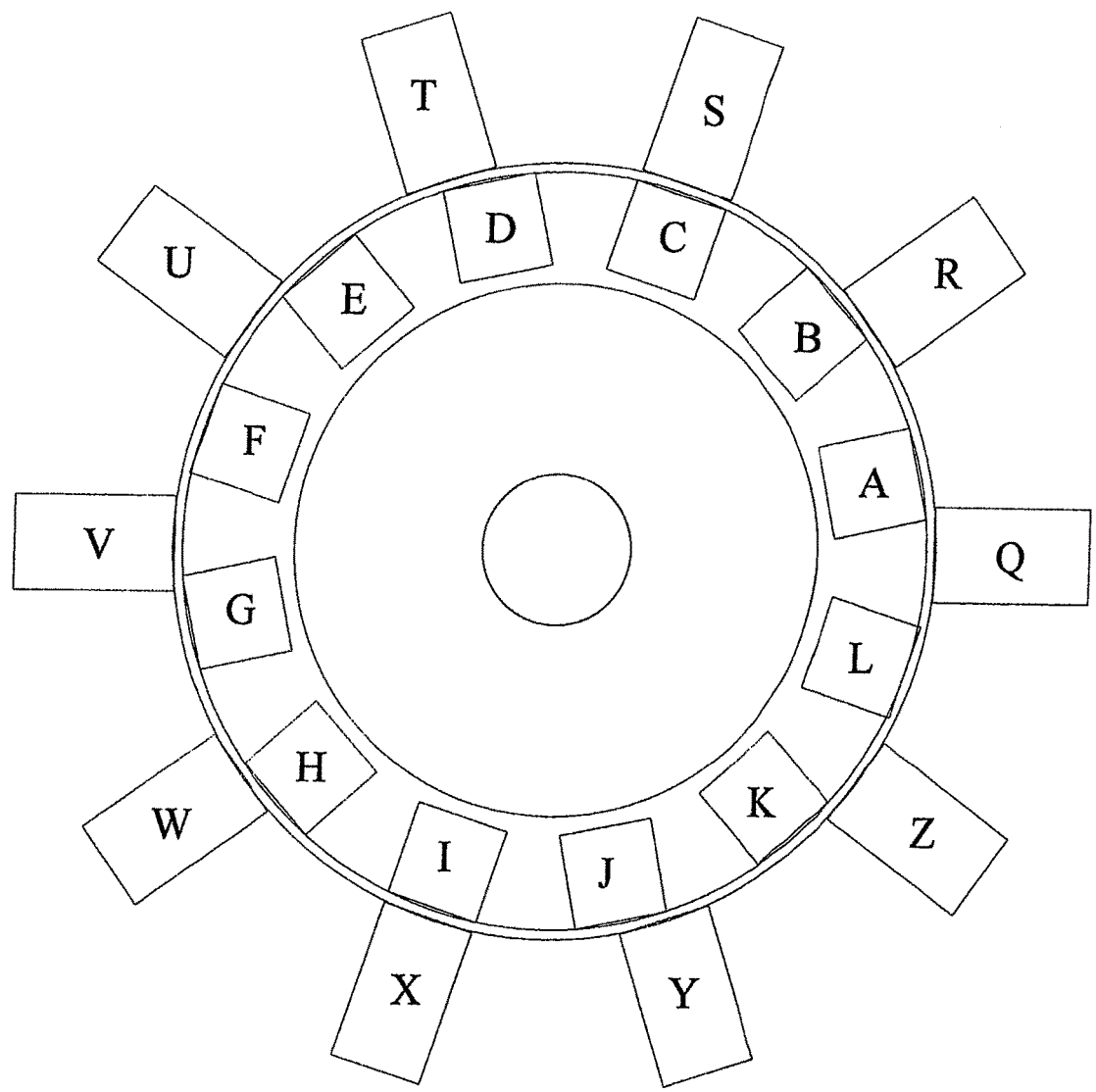
FIG. 22 illustrates the second relative counterclockwise movement of the rotational magnetics assembly of the rotary configuration shown in FIG. 20.

FIG. 22 illustrates the second step where element Q is subjected to a magnetic pulse of a polarity such as to cause repulsion between elements Q and A. This pulse is terminated by the time elements S and C are in magnetic alignment.

Figure 23:
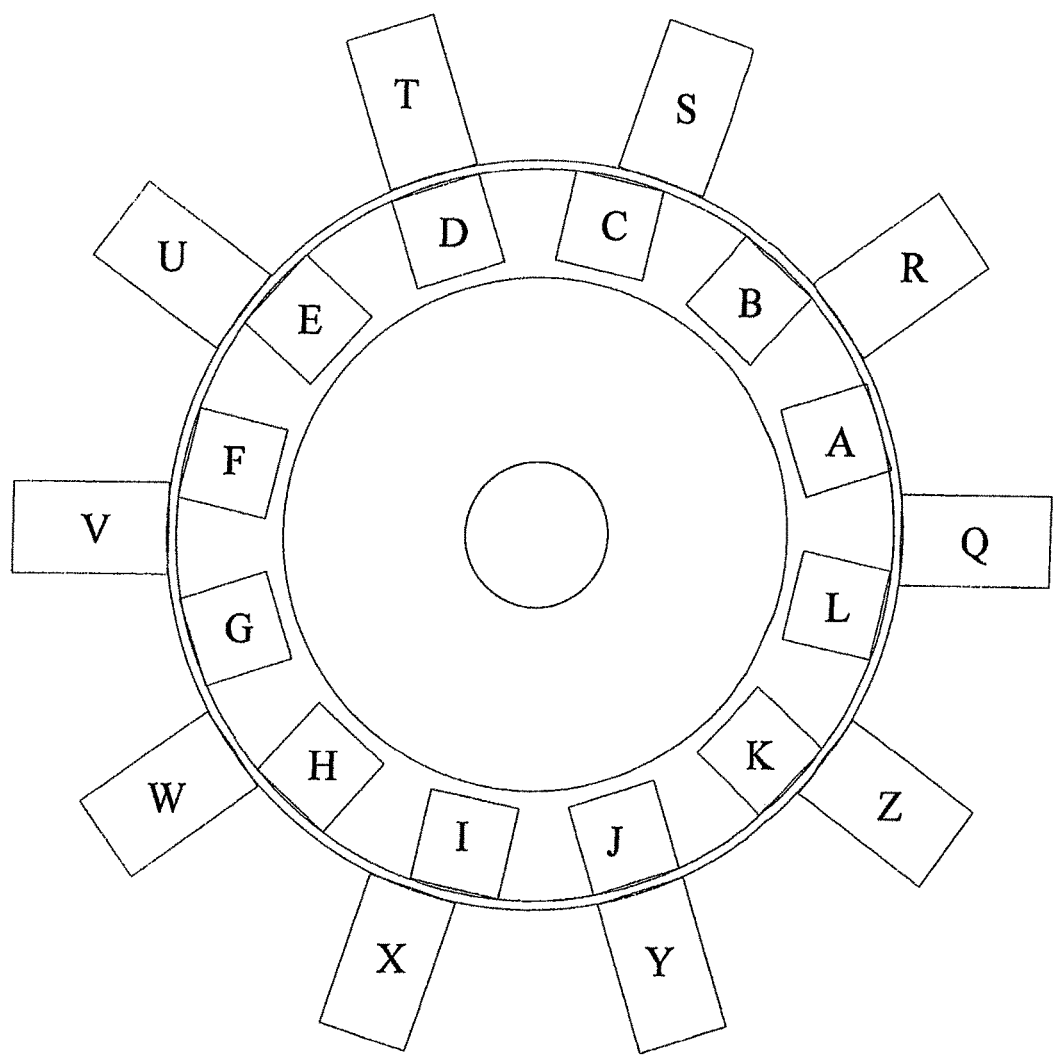
FIG. 23 illustrates the third relative counterclockwise movement of the rotational magnetics assembly of the rotary configuration shown in FIG. 20.

FIG. 23 illustrates the third step of the sequence. Element R is magnetically pulsed to cause repulsion against element B. This magnetic unbalance forces the inner array to move to the next stable position in which elements T and D are in magnetic alignment.

Figure 24:
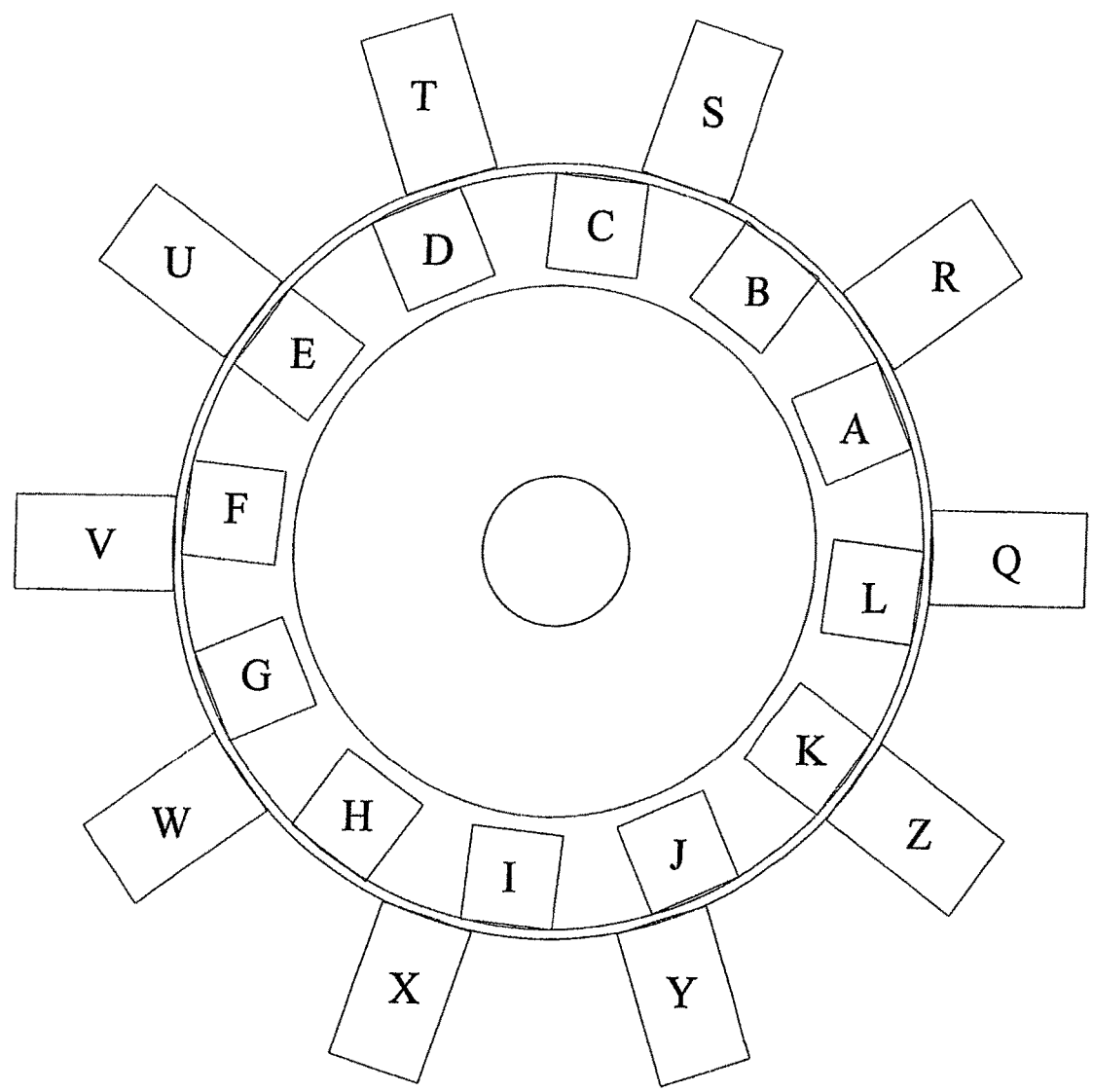
FIG. 24 illustrates the fourth relative counterclockwise movement of the rotational magnetics assembly of the rotary configuration shown in FIG. 20.

FIG. 24 illustrates the fourth step of the sequence. Element S is magnetically pulsed to repel element C and force the re-alignment of the magnetic arrays in which elements U and E are in magnetic balance.

Figure 25:
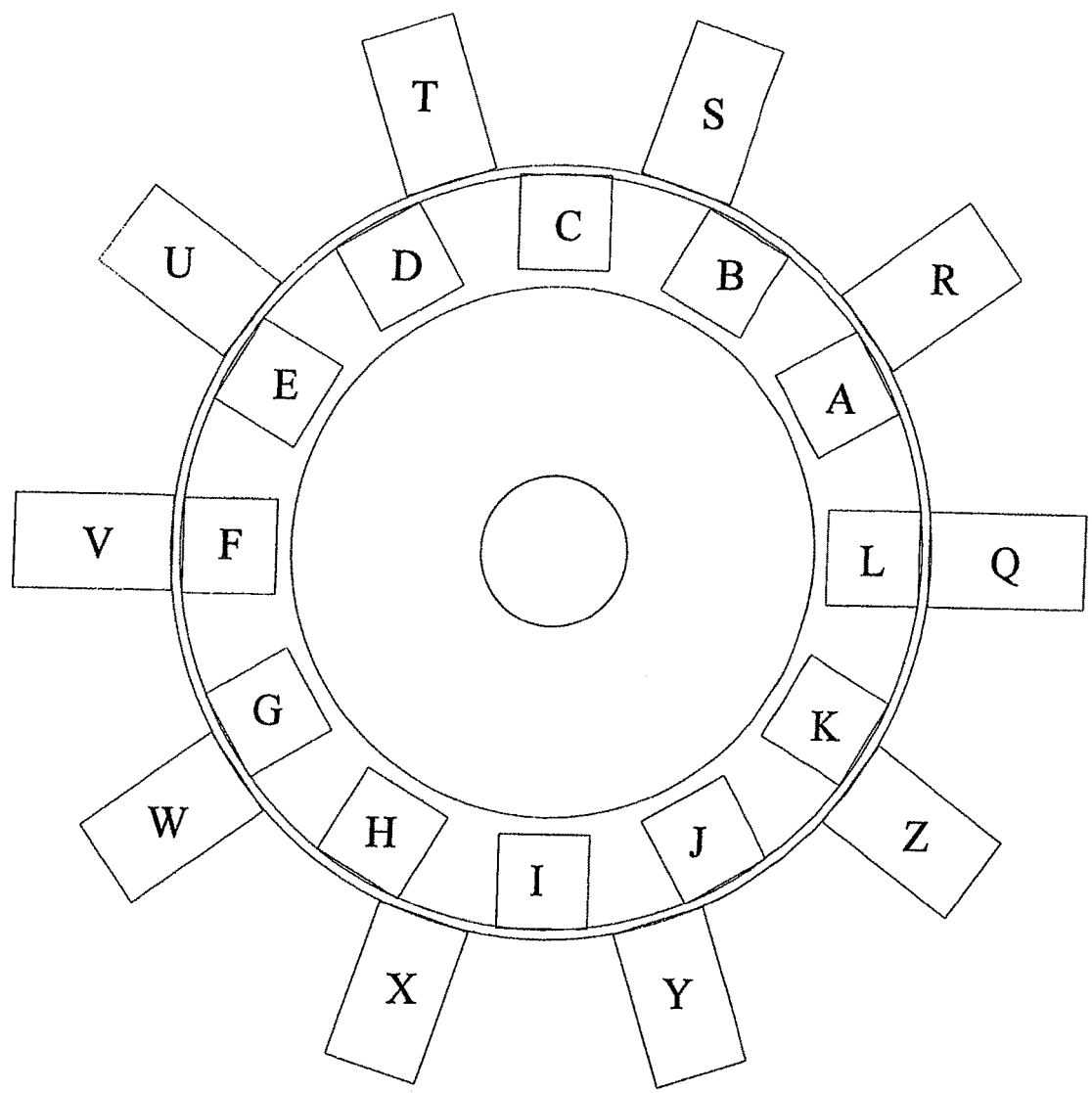
FIG. 25 illustrates the final relative counterclockwise movement of the rotational magnetics assembly of the rotary configuration shown in FIG. 20.

FIG. 25 illustrates the fifth and final step of the movement control sequence. Element T has been pulsed such that it repels element D and causes the magnetic balance of the inner and outer arrays to re-align with elements V and F in magnetic balance.

The previous example is a simplified description of a functional motion inducing sequence. In actual practice, the corresponding elements V-Z and Q can also be driven with magnetic pulses to induce motion. The example demonstrates that the identification of a magnetic sub-array is dynamic. Before the motion sequence was initiated, the outer arrays' two sub-arrays comprise elements Q, R, S, T, U, and V which form one sub-array and elements V, W, X, Y, Z, and Q as the second sub-array. The inner arrays comprise one sub-array consisting of elements A-G and a second sub-array consisting of elements G-L. At the completion of the foregoing sequence, the two inner sub-arrays' elements are L, A, B, C, D, E, and F which form the first inner sub-array and F, G, H, I, J, K, and L which form the second inner sub-array.

Figure 26:
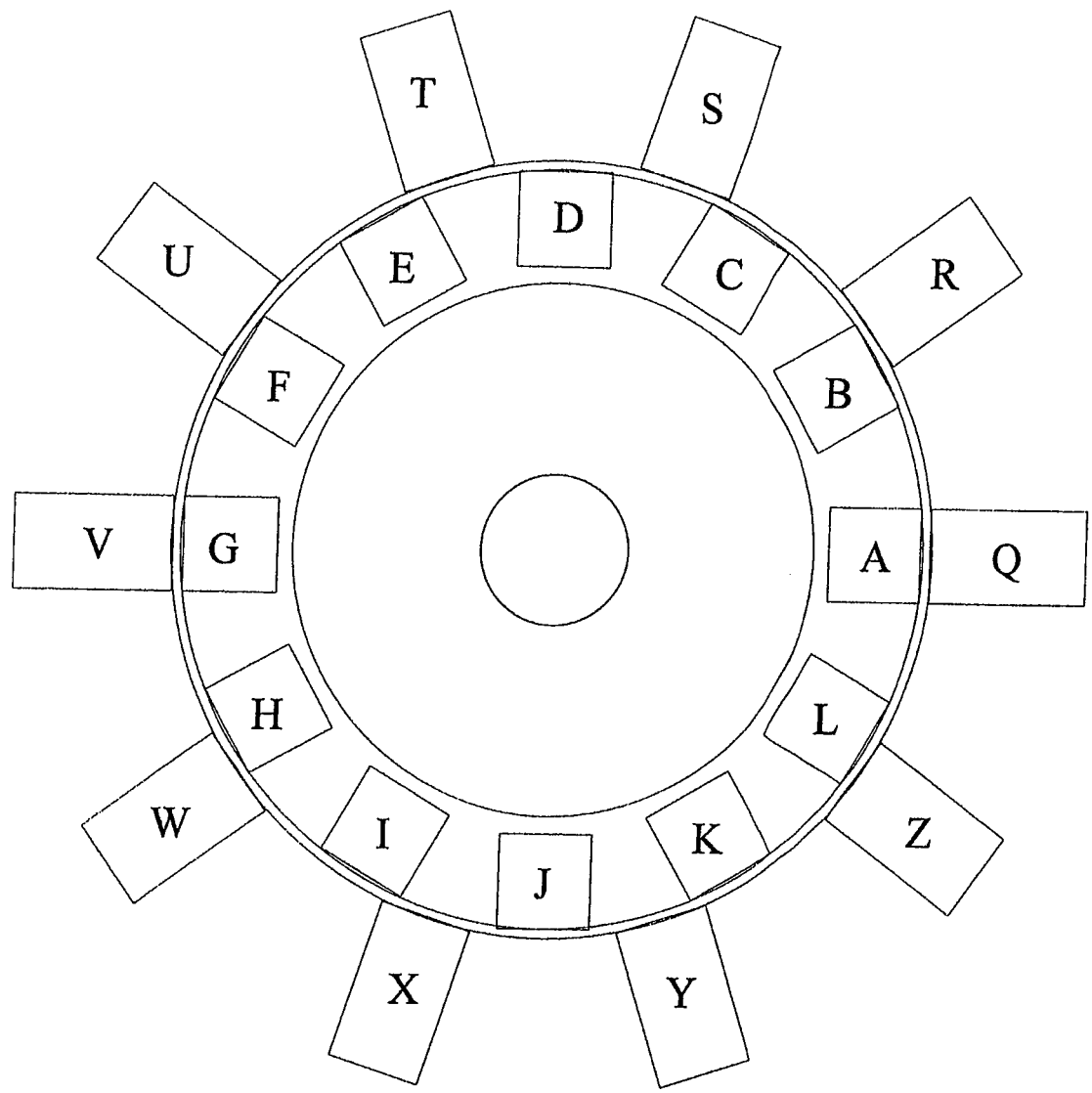
FIG. 26 illustrates a starting position of the rotational magnetics assembly for clockwise movement.

The following sequence of figures, FIGS. 26 through 31, shows an induced clockwise motion of the inner magnetic field source array. FIG. 26 illustrates a starting position of the relative position of the inner and outer magnetic field source arrays. The following figures illustrate the steps required to index to the arrays.

Figure 27:
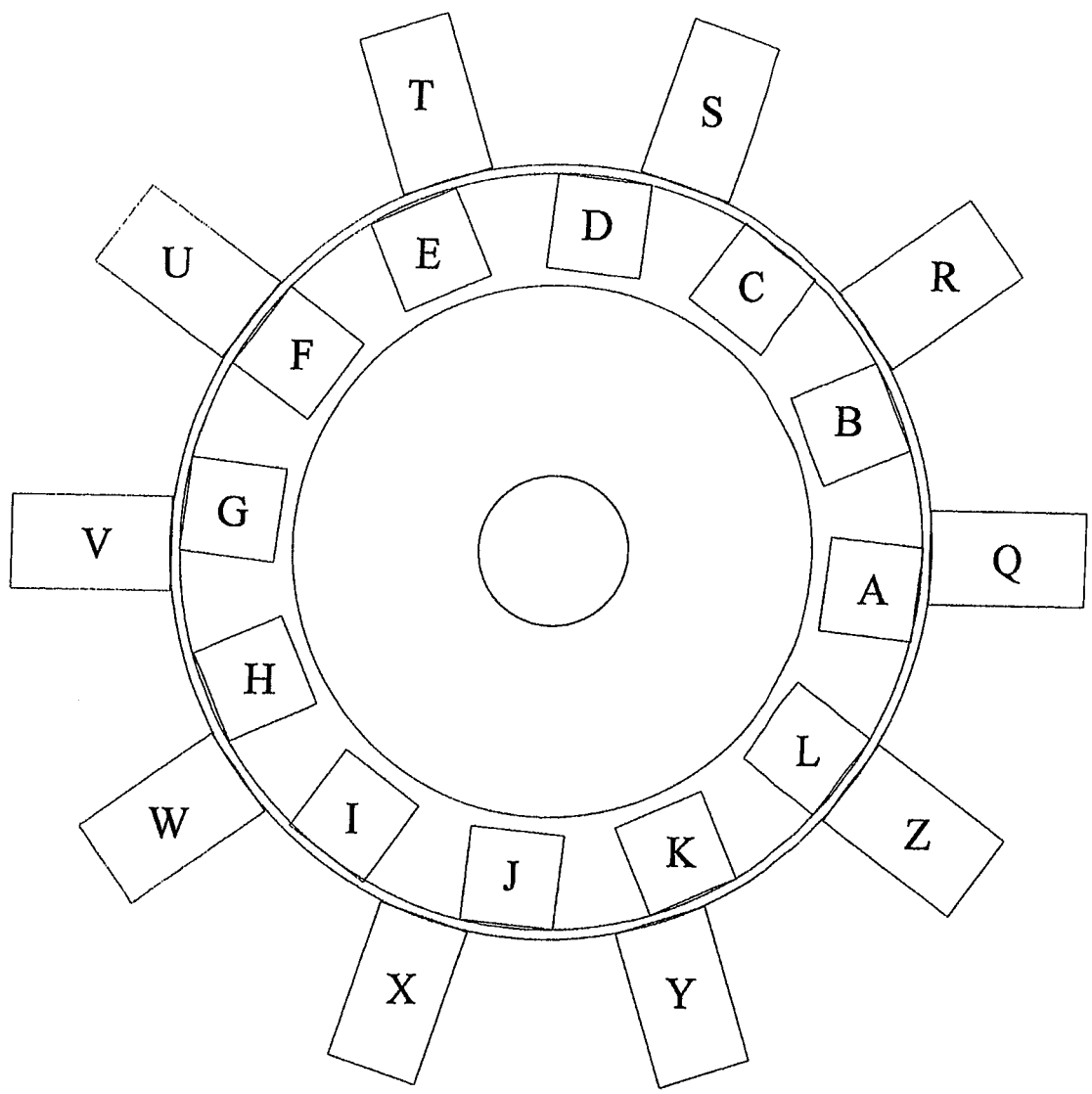
FIG. 27 illustrates the initial relative clockwise movement of the rotational magnetics assembly shown in FIG. 26.

FIG. 27 illustrates the relative motion between the outer and inner arrays after element U of the outer array is energized to generate an attractive force. Element T can also be energized but is on for the next step also.

Figure 28:
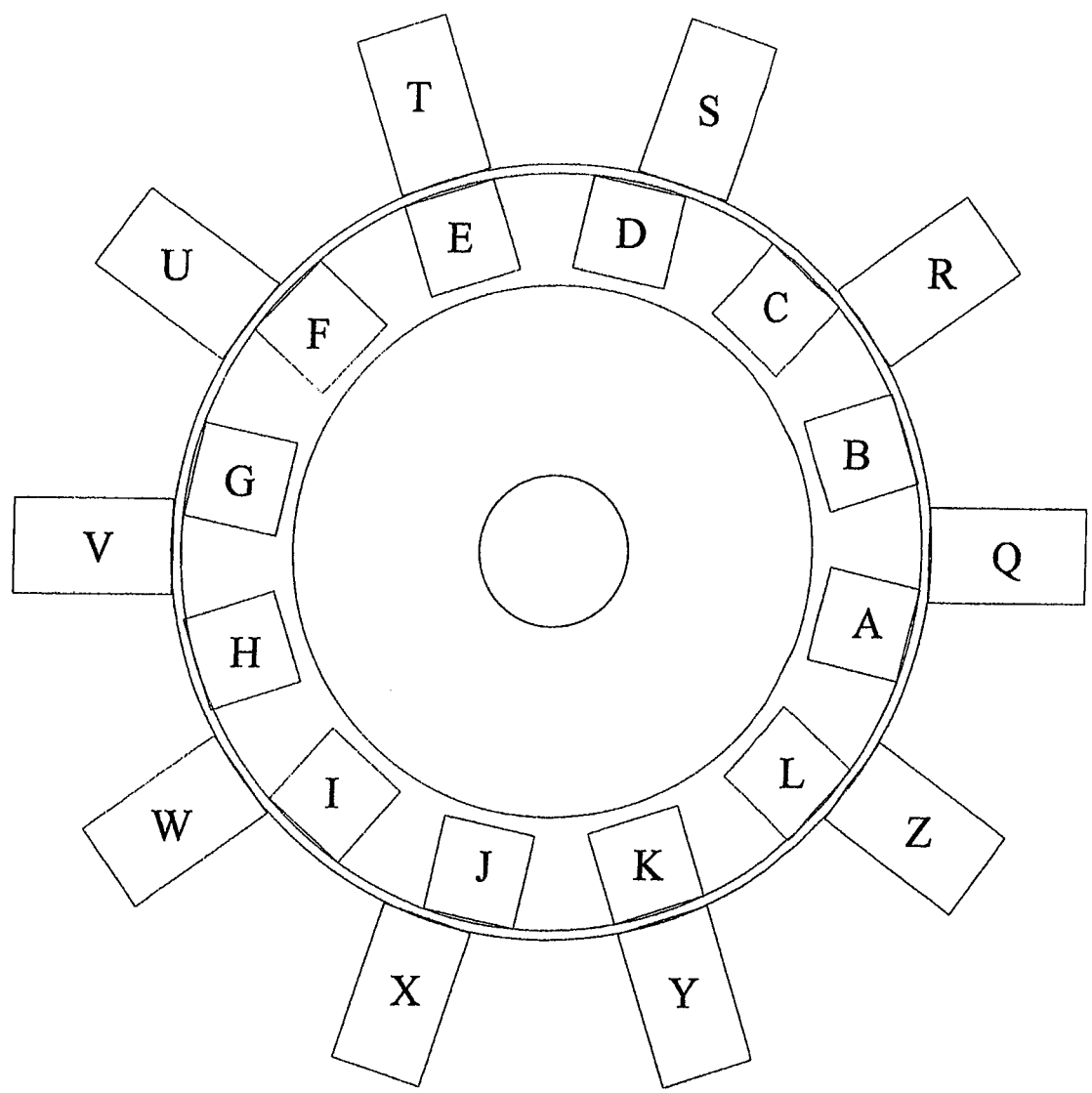
FIG. 28 illustrates the second relative clockwise movement of the rotational magnetics assembly shown in FIG. 26.

FIG. 28 illustrates the second step of clockwise induced motion. Element T has been energized and attracts inner element E causing the inner array to shift position.

Figure 29:
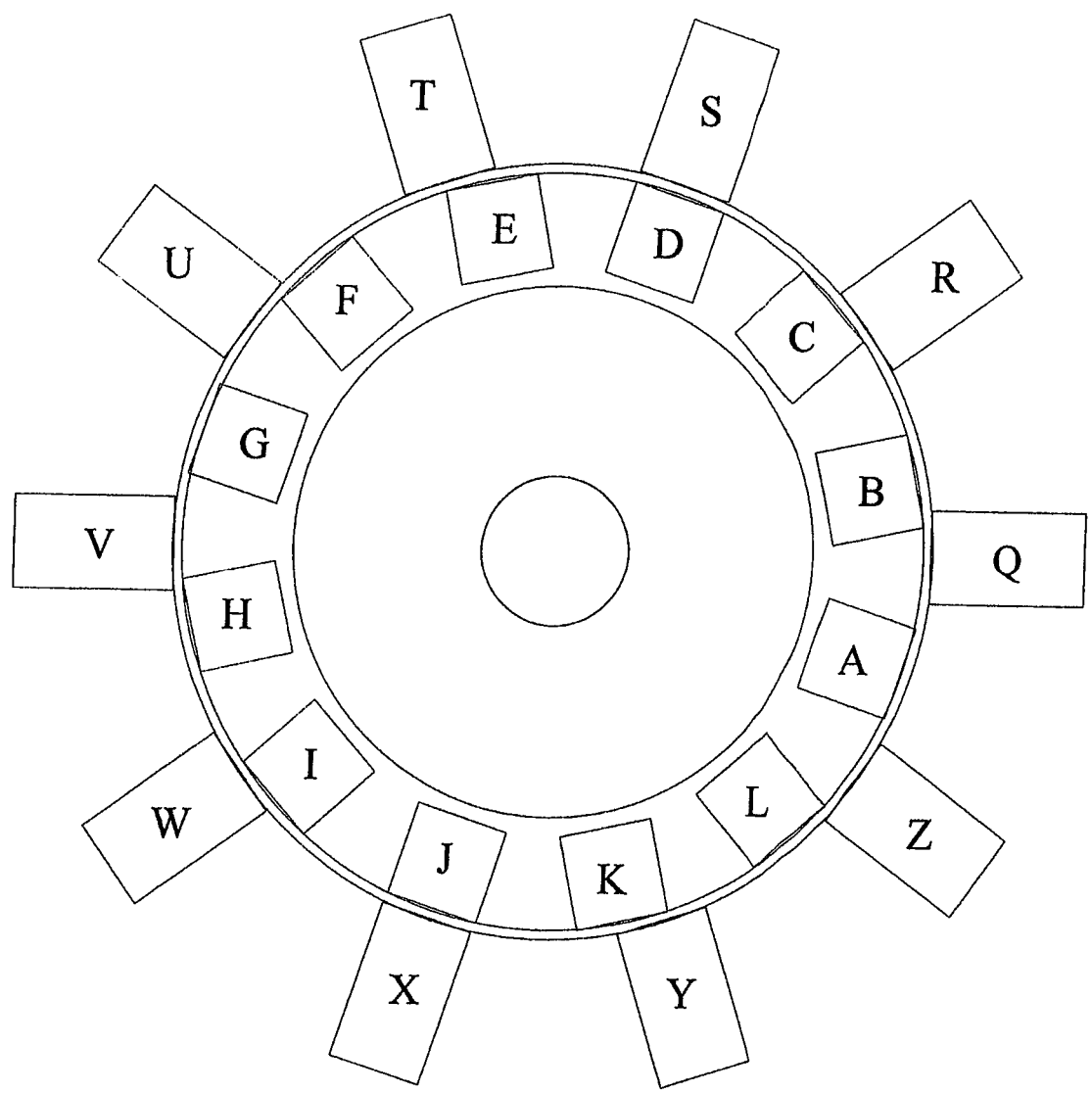
FIG. 29 illustrates the third relative clockwise movement of the rotational magnetics assembly shown in FIG. 26.

FIG. 29 illustrates the third step of the clockwise motion sequence. Element S of the outer array has been energized attracting element D of the inner array. This induces the required relative motion.

Figure 30:
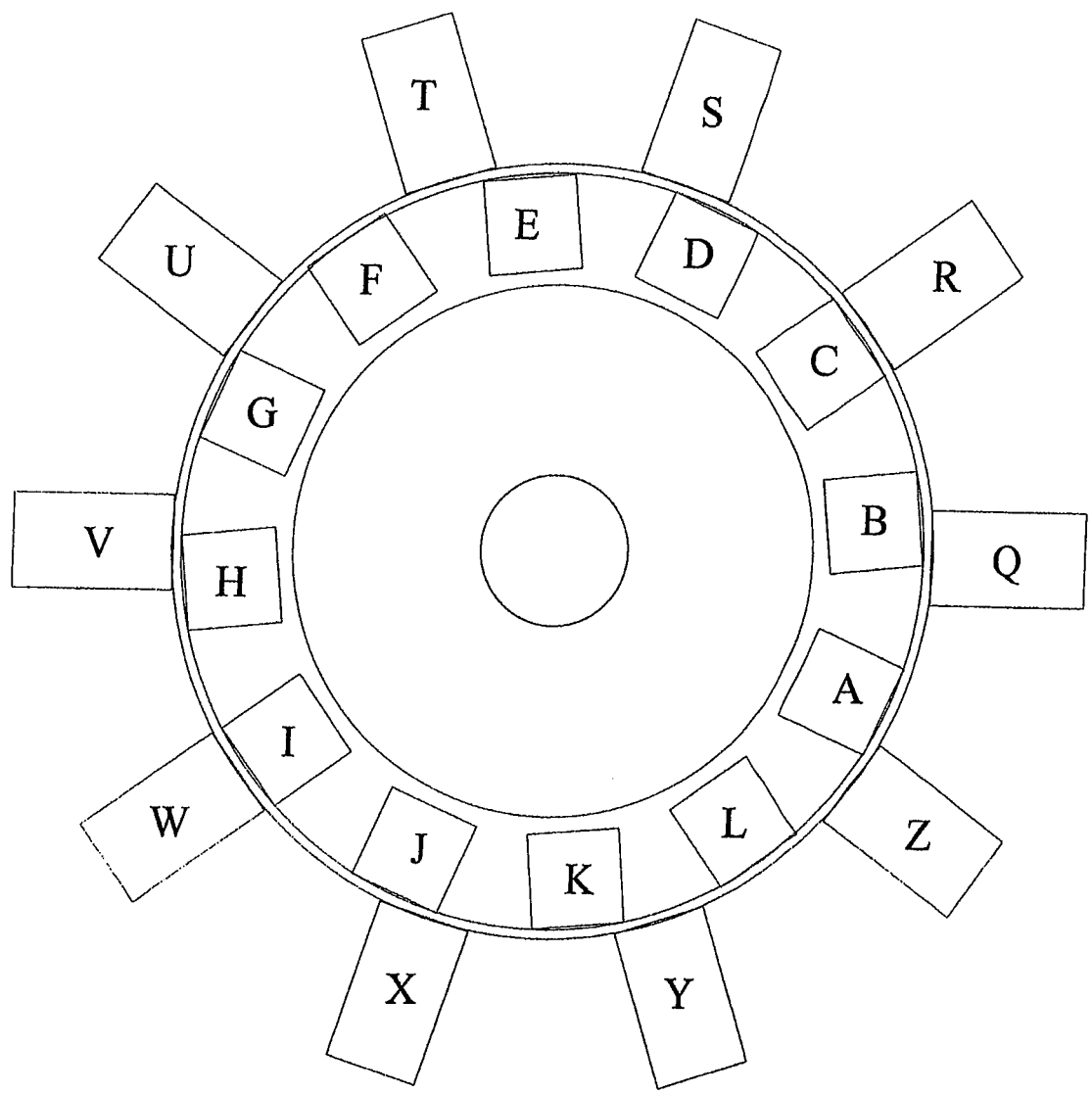
FIG. 30 illustrates the fourth relative clockwise movement of the rotational magnetics assembly shown in FIG. 26.

FIG. 30 illustrates the fourth step of the clockwise motion sequence. Element R has been energized to attract element C of the inner array.

Figure 31:
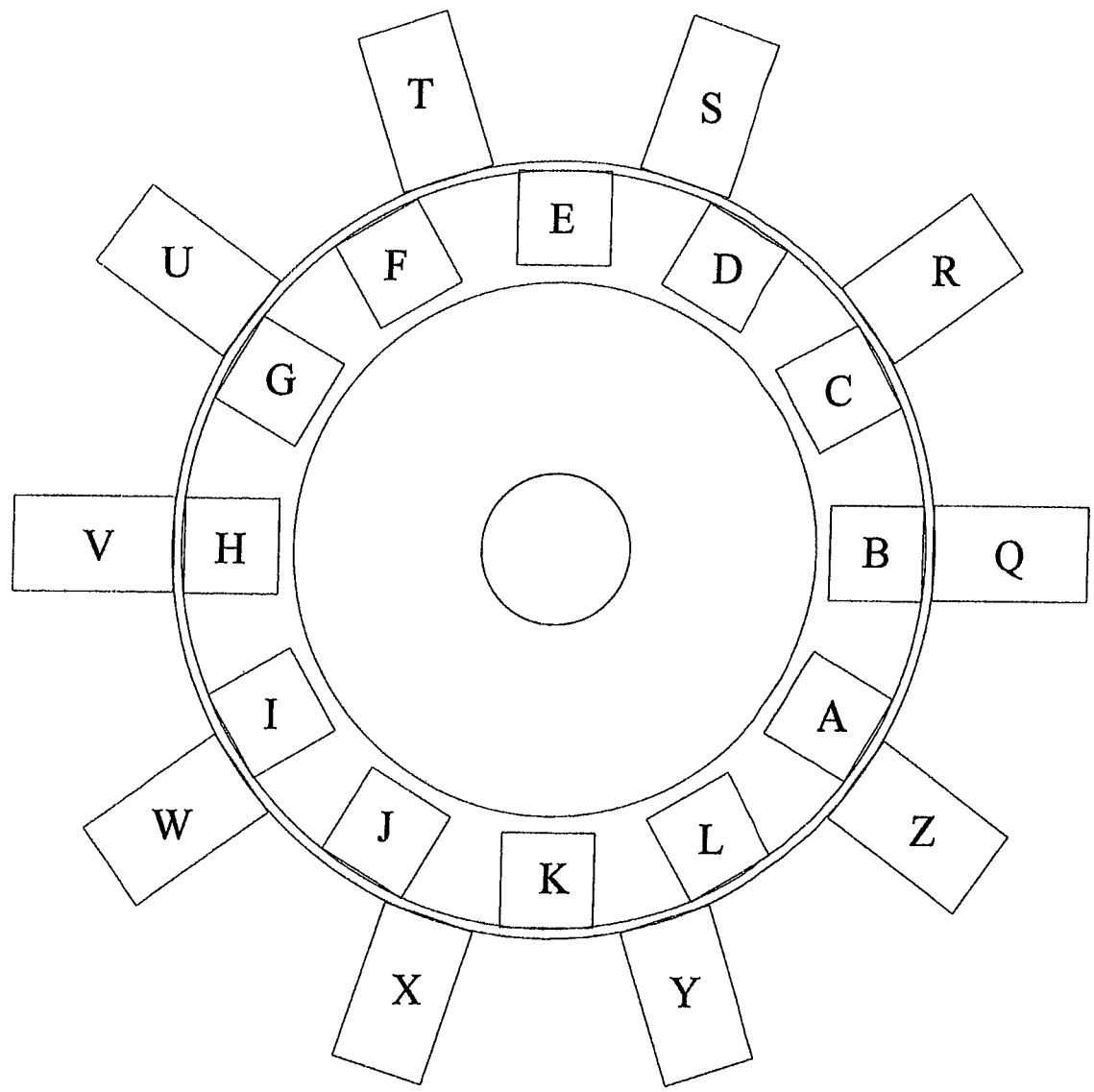
FIG. 31 illustrates the final relative clockwise movement of the rotational magnetics assembly shown in FIG. 26.

FIG. 31 illustrates the fifth and final step of the clockwise motion sequence. Element Q has been energized to attract element B inducing the desired motion.

When the inner and outer magnetic arrays have repelling polarities and the strength and spacing of the magnetic fields are such that magnetic contours are present, the magnetically stable positions are the same as for attracting polarities. To induce relative motion, the difference is which of the outer magnetic arrays is pulsed to an opposite polarity to induce motion in the desired direction.

While the foregoing description has been with reference to particular examples and in accordance with the present invention, it will be appreciated by persons skilled in the art that changes may be made without departing from the principles and spirit of the invention. Accordingly, the scope of the present invention can only be ascertained with reference to the appended claims.

What is claimed is:

1. A system comprising:
   at least two rotor segments adjacent to each other along a rotor axis, each rotor segment having an array of magnets disposed around the outer circumferential periphery of the respective rotor segment wherein each array comprises a plurality of magnets having the same polarity for all of the magnets in that array and wherein the arrays of magnets comprising the rotor segments on each rotor segment are arranged with different pitches with respect to each other rotor segment;
   at least two stator segments adjacent to each other coaxial with the rotor axis spaced a uniform radial distance apart from corresponding respective rotor segments, each stator segment having an array of magnets disposed around the inner circumferential periphery of the respective stator segment wherein each array comprises a plurality of magnets having opposite polarities to the magnets comprising the rotor segments so there is a mutual attraction between the respective arrays of magnets comprising the rotor segments and stator segments;
   an electromagnet associated with each magnet comprising each stator segment to selectively vary the magnetic field produced by the associated magnet comprising the stator segment to enable the rotor segments to be indexed relative to the stator segments; and
   a control system to selectively energize the electromagnets to induce rotation of the rotor segments and control speed of rotation of the rotor segments.

* * * * *